(12) United States Patent
Nakamura

(10) Patent No.: US 8,599,671 B2
(45) Date of Patent: *Dec. 3, 2013

(54) OBJECTIVE LENS, OPTICAL PICKUP APPARATUS, AND OPTICAL INFORMATION RECORDING REPRODUCING APPARATUS

(75) Inventor: Kentarou Nakamura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/468,510

(22) Filed: May 10, 2012

(65) Prior Publication Data

US 2012/0218878 A1    Aug. 30, 2012

Related U.S. Application Data

(63) Continuation of application No. 13/236,302, filed on Sep. 19, 2011, now Pat. No. 8,310,909, which is a continuation of application No. 12/773,588, filed on May 4, 2010, now Pat. No. 8,023,389.

(30) Foreign Application Priority Data

| May 7, 2009 | (JP) | 2009-112918 |
| May 7, 2009 | (JP) | 2009-112919 |
| Jun. 23, 2009 | (JP) | 2009-148535 |
| Mar. 8, 2010 | (JP) | 2010-050599 |

(51) Int. Cl.
*G11B 7/00*    (2006.01)

(52) U.S. Cl.
USPC ............. 369/112.08; 369/112.07; 369/112.26

(58) Field of Classification Search
None
See application file for complete search history.

(56) References Cited

U.S. PATENT DOCUMENTS

| 6,624,941 | B2 | 9/2003 | Takeuchi et al. |
| 7,656,770 | B2 | 2/2010 | Nakamura et al. |
| 7,843,793 | B2 | 11/2010 | Nakamura et al. |
| 2003/0185134 | A1 | 10/2003 | Kimura et al. |
| 2004/0062180 | A1 | 4/2004 | Mimori et al. |
| 2008/0013415 | A1 | 1/2008 | Nomura et al. |

FOREIGN PATENT DOCUMENTS

JP    2008-293630    12/2008

*Primary Examiner* — Adam R Giesy
(74) *Attorney, Agent, or Firm* — Cozen O'Connor

(57) ABSTRACT

An objective lens a first optical path difference providing structure in which a first basic structure and a second basic structure are overlapped with each other. The first basic structure is a blaze-type structure which emits a Xth-order diffracted light flux, when the first light flux passes through the first basic structure, where the value of X is an odd integer. At least a part of the first basic structure arranged around an optical axis includes a step facing an opposite direction to the optical axis. The second basic structure is a blaze-type structure which emits a Lth-order diffracted light flux, when the first light flux passes through the second basic structure, where the value of L is an even integer. At least a part of the second basic structure arranged around the optical axis includes a step facing the optical axis.

11 Claims, 8 Drawing Sheets

FIG. 4a
FIG. 4b
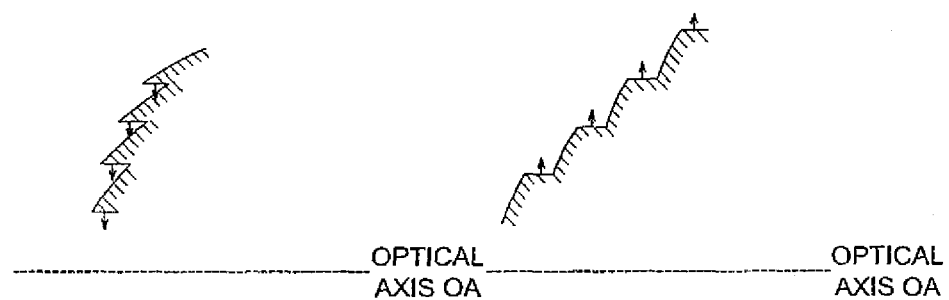
OPTICAL AXIS OA
FIG. 5a
FIG. 5b
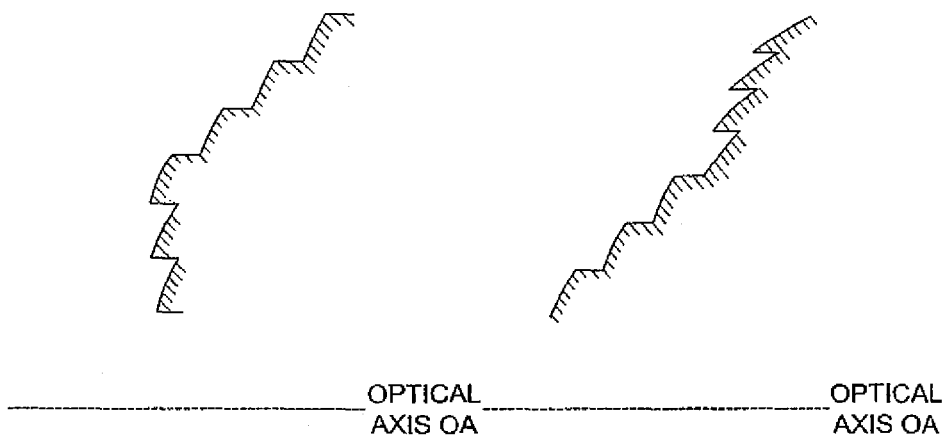
OPTICAL AXIS OA

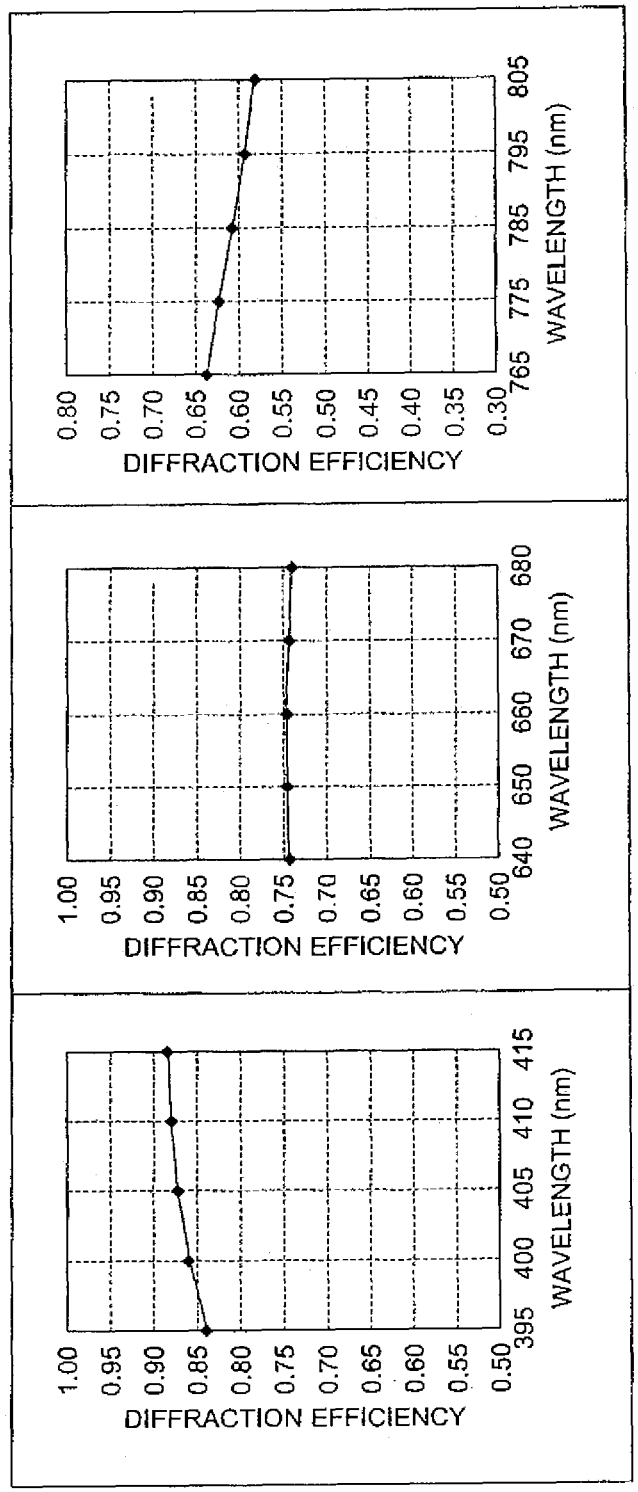

US 8,599,671 B2

OBJECTIVE LENS, OPTICAL PICKUP APPARATUS, AND OPTICAL INFORMATION RECORDING REPRODUCING APPARATUS

CROSS REFERENCE TO RELATED APPLICATIONS

This application is a continuation of U.S. patent application Ser. No.: 13/236,302, which was filed with the U.S. Patent and Trademark Office on Sep. 19, 2011, which is a continuation of U.S. patent application Ser. No. 12/773,588, which was filed with the U.S. Patent and Trademark Office on May 4, 2010. Priority is claimed on Japanese Patent Application Nos. 2009-112918 filed on May 7, 2009, 2009-112919 filed on May 7, 2009, 2009-148535 filed on Jun. 23, 2009, and 2010-050599 filed on Mar. 8, 2010, in Japanese Patent Office, the entire contents of which are hereby incorporated by reference.

TECHNICAL FIELD

The present invention relates to an optical pickup apparatus which compatibly records and/or reproduces (which may be described as "records/reproduces" in the present specification) information for different types of optical discs, and further relates to an objective lens and an optical information recording reproducing apparatus.

BACKGROUND ART

There has been a trend in recent years for a laser light source which is used as a light source in an optical pickup apparatus for reproducing information which has been recorded in an optical disc and for recording information on an optical disc, toward a shorter wavelength. For example, laser light sources with 390-420 nm wavelength, such as a blue-violet semiconductor laser, are reaching the stage of practical application. By using these blue-violet laser light sources, information of 15-20 GB can be recorded on an optical disc with a diameter of 12 cm by using an objective lens with the same numerical aperture (NA) as that for DVD (Digital Versatile Disc), and information of 23-25 GB can be recorded onto an optical disc with a diameter of 12 cm by using an objective lens with increased NA up to 0.85.

As an example of an optical disc using the above-described objective lens with NA 0.85, there is cited a BD (Blu-ray Disc). Since increased comma is generated because of a tilt (skew) of the disc, a BD has been designed so that a protective layer has thinner thickness (which is 0.1 mm, while that of DVD is 0.6 mm) than that of DVD, to reduce the amount of comma caused by the skew.

On the other hand, it is considered that an optical disc player/recorder (optical information recording reproducing apparatus) is worthless as a product when the optical disc player/recorder is capable of recording/reproducing information just for BDs property. Taking account of a fact that, at present DVDs and CDs (Compact Discs) storing various kinds of information have been on the market, it is not sufficient that the optical disc player/recorder can record/reproduce information just for BDs, and an attempt providing an optical disc player/recorder capable to record/reproduce information also for DVDs and CDs which have already been owned by users, leads to enhancement of a commercial value of the optical disc player/recorder for BDs. From such the background, an optical pickup apparatus installed in the high-density optical disc player/recorder is required to be capable of appropriately recording/reproducing information not only for BDs but also for a DVDs and a CDs.

As a method by which information can be adequately recorded/reproduced while the compatibility is maintained to anyone of BDs, DVDs and CDs, there can be considered a method to selectively switch an optical system for BDs and an optical system for DVDs and CDs, corresponding to a recording density of an optical disc on which information is recorded/reproduced. However, it is disadvantageous tor the size-reduction and increases a cost, because plural of optical systems are needed.

Accordingly, in order to simplify a structure of the optical pickup apparatus and to intend a reduction of its cost, it is preferable to form the optical system for BDs and the optical system for DVDs and CDs into a common optical system, to reduce the number of optical parts forming the optical pickup apparatus as much as possible, even in the optical pickup apparatus with compatibility. Then, providing the common objective lens which is arranged with facing an optical disc, is most advantageous for the simplification of the structure and for cost reduction of the optical pickup apparatus. In order to obtain a common objective lens for plural kinds of optical discs which use different wavelengths for recording/reproducing information, it is required that a diffractive structure having a wavelength dependency for the spherical aberration, is formed in the objective optical system.

JP-A No. 2008-293630 has disclosed an objective lens which includes a structure in which two basic structures each provided as a diffractive structure are overlapped with each other and can be commonly used for three types of optical discs, and also has disclosed an optical pickup apparatus in which this objective optical system is mounted.

Two of the three types of optical disc disclosed in JP-A No. 2008-293630 are DVDs and CDs. With respect to the rest, JP-A No. 2008-293630 has just touched about BD, and all of its examples actually employ HD-DVD, which suggests that JP-A No. 2008-293630 has been provided with emphasizing a compatibility of three types of optical disc of DVD, CD and HD-DVD rather than BD. The inventor has studied an applicability of the examples of the application to achieving compatibility of three types of optical disc of BDs, DVDs, and CDs, and has found an issue that a working distance of the objective lens for CD becomes so small that the objective lens can touch an optical disc during recording and reproducing operations. Herein, a working distance means a distance along the optical axis from a surface of the optical disc to a surface vertex of the optical surface of the objective lens facing the optical discs.

SUMMARY

The present invention is achieved with considering the above problem, and provides an optical pickup apparatus, an optical information recording reproducing apparatus and an objective lens suitable to them, which realize that information can be recorded and/or reproduced compatibly for three kinds of optical disc of BDs, DVDs and CDs by using a common objective lens, and that a sufficient working distance can be secured even for CDs which has a thick substrate.

An objective lens as an embodiment of the invention is provided for use in an optical pickup apparatus which comprises a first light source for emitting a first light flux having a first wavelength $\lambda 1$, a second light source for emitting a second light flux having a second wavelength $\lambda 2$ ($\lambda 2 > \lambda 1$), a third light source for emitting a third light flux having a third wavelength $\lambda 3$ ($\lambda 3 > \lambda 2$). The optical pickup apparatus records and/or reproduces information with the first light flux on an information recording surface of a first optical disc having a protective substrate with a thickness t1, records and/or reproduces information with the second light flux on an information recording surface of a second optical disc having a protective substrate with a thickness t2 (t1<t2), and records and/or reproduces information with the third light flux on an information recording surface of a third optical disc having a protective substrate with a thickness t3 (t2<t3). The objective lens comprises: an optical surface including a central area, an intermediate area surrounding the central area, and a peripheral area surrounding the intermediate area. The central area comprises a first optical path difference providing structure and the intermediate area comprises a second optical path difference providing structure. The objective lens converges the first light flux which passes through the central area, onto the information recording surface of the first optical disc so that information can be recorded and/or reproduced on the information recording surface of the first optical disc. The objective lens converges the second light flux which passes through the central area, onto the information recording surface of the second optical disc so that information can be recorded and/or reproduced on the information recording surface of the second optical disc. The objective lens converges the third light flux which passes through the central area, onto the information recording surface of the third optical disc so that information can be recorded and/or reproduced on the information recording surface of the third optical disc. The objective lens converges the first light flux which passes through the intermediate area, onto the information recording surface of the first optical disc so that information can be recorded and/or reproduced information on the information recording surface of the first optical disc. The objective lens converges the second light flux which passes through the intermediate area, onto the information recording surface of the second optical disc so that information can be record and/or reproduce information on the information recording surface of the second optical disc. The objective lens does not converge the third light flux which passes through die intermediate area, onto the information recording surface of the third optical disc so that information can be recorded and/or reproduced on the information recording surface of the third optical disc. The objective lens converges the first light flux which passes through the peripheral area, onto the information recording surface of the first optical disc so that information can be recorded and/or reproduced on the in information recording surface of the first optical disc. The objective lens does not converge the second light flux which passes through the peripheral area, onto the information recording surface of the second optical disc so that information can be recorded and/or reproduced on the information recording surface of the second optical disc. The objective lens does not converge the third light flux which passes through the peripheral area, onto the information recording surface of the third optical disc so that information can be recorded and/or reproduced on the information recording surface of the third optical disc. The first optical path difference providing structure comprises a first basic structure and a second basic structure which are overlapped with each other. The first basic structure is a blaze-type structure, which emits a Xth-order diffracted light flux with a larger light amount than diffracted light fluxes with any other diffraction order, when the first light flux passes through the first basic structure, which emits a Yth-order diffracted light flux with a larger light amount than diffracted light fluxes with any other diffraction order, when the second light flux passes through the first basic structure, and which emits a Zth-order diffracted light flux with a larger light amount than diffracted light fluxes with any other diffraction order, when the third light flux passes through the first basic structure, where a value of X is an odd integer. At least a part of the first basic structure arranged around an optical axis in the central area comprises a step facing an opposite direction to the optical axis. The second basic structure is a blaze-type structure which emits a Lth-order diffracted light flux with a larger light amount than diffracted light fluxes with any other diffraction order, when the first light flux passes through the second basic structure, which emits a Mth-order diffracted light flux with a larger light amount than diffracted light fluxes with any other diffraction order, when the second light flux passes through the second basic structure, and which emits a Nth-order diffracted light flux with a larger light amount than diffracted light fluxes with any other diffraction order, when the third light flux passes through the second basic structure, where a value of L is an even integer. At least a part of the second basic structure arranged around the optical axis in the central area comprises a step facing the optical axis.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

FIG. 4a is a diagram showing steps facing the optical axis and FIG. 4b is a diagram showing steps facing the opposite direction to the optical axis;

FIG. 5a is a diagram showing a form such that steps faces the optical axis around the optical axis, the directions of steps are switched midway, and steps face the opposite direction to the optical axis around the intermediate area, and FIG. 5b is a diagram showing a form such that steps faces the opposite direction to the optical axis around the optical axis, the directions of steps are switched midway, and steps face the optical axis around the intermediate area;

FIGS. 9a-9c are diagrams showing a wavelength dependency of diffraction efficiency of Example 1.

DESCRIPTION OF EMBODIMENTS

Figure 1:
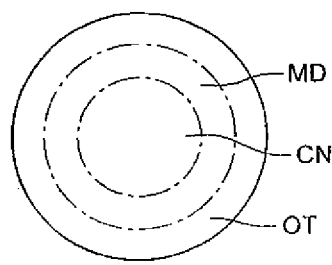
FIG. 1 is a diagram showing objective lens OL according to the present embodiment, which is a single lens and is viewed along the optical axis.

Hereafter, although embodiments of the present invention will be described in details, the present invention is not limited to this embodiment.

The inventor of the prevent invention, as a result of earnest and extensive study, has found the following problem. In all the embodiments disclosed in JP-A No. 2008-293630, steps of a basic structure which exhibits third diffraction order for a blue-violet light flux, face the direction of the optical axis. Because of such the structure, in a thick objective lens which is used for achieving compatibility of three types of optical disc of BDs, DVDs, and CDs and is thick along the optical axis, its working distance becomes short when the objective lens works for CDs.

Based on the above viewpoint, the inventor has found that, even in a thick objective lens which is used for achieving compatibility of three types of optical disc of BDs, DVDs, and CDs and is thick along the optical axis, a sufficient working distance can be secured when the objective lens works for CDs, by providing steps of a basic structure which exhibits an odd diffraction order for a blue-violet light flux and by arranging the step to face the opposite direction to the optical axis.

It is preferable that another basic structure is overlapped with (is superimposed to) the above basic structure in order to achieve the compatibility of the three types of optical disc of BDs, DVDs, and CDs. Accordingly, the inventor has provided a structure by overlapping two types of steps together as follows. First, there is provided steps of a basic structure which diffracts a diffracted light flux with an odd diffraction order for a blue-violet light flux, and the steps in the basic structure are positioned to face the opposite direction to the optical axis. Second there is provided steps of another basic structure which diffracts a diffracted light with an even diffraction order for a blue-violet light flux, and the steps of another basic structure are positioned to have the direction of the optical axis. The inventor has found that by overlapping these steps together, the height of steps measured after the steps are overlapped together can be controlled not to be excessive high with achieving the compatibility of the three types of optical disc of BDs, DVDs, and CDs. Accordingly, it enables to restrict loss of light amount caused due to manufacturing error and enables to restrict a fluctuation of a diffraction efficiency caused when a wavelength changes. By these effects, information can be recorded and/or reproduced for three types of optical discs of BDs, DVDs, and CDs satisfactory by using a common objective lens.

Further, the above structure can provide an objective lens with well-balanced light utilizing efficiency so as to maintain high light utilizing efficiency for each of the three types of optical disc of BDs, DVDs, and CDs. Since the objective lens employs a first optical path difference providing structure formed by overlapping two types of structure as the first basic structure and the second basic structure together, design flexibility of the objective lens can be secured more largely compared with an optical path difference providing structure formed by only one basic structure such as a staircase structure, but not overlapping plural basic structures. Such design flexibility is advantageous especially in a lens with a small effective diameter.

Furthermore, by the above features, an aberration caused when a wavelength of an incident light changed to be longer, can be changed toward under-corrected (deficient correction) direction. Thereby, an aberration caused when a temperature of an optical pickup apparatus raises can be controlled to be small, which enables to provide an objective lens capable of maintaining a stable performance even under a temperature change, when plastic is employed for the material of the objective lens.

In the objective lens, it is preferable that the value of L is an even number whose absolute value is 4 or less, and the value of X is an odd number whose absolute value is 5 or less.

The objective lens preferably satisfies $(X, Y, Z)=(-1, -1, -1)$ and $(L, M, N)=(2, 1, 1)$.

In the objective lens, all steps of the first basic structure arranged in the central area can face the opposite direction to the optical axis.

In the objective lens, apart of the first basic structure arranged around the intermediate area in the central area can comprise a step facing the optical axis.

In the objective lens, all steps of the second basic structure arranged in the central area can face the optical axis.

In the objective lens, a part of the second basic structure arranged around the intermediate area in the central area can comprise a step facing the opposite direction to the optical axis.

In the objective lens, at least a part of the first optical path difference providing structure arranged around the optical axis in the central area includes both of a step facing an opposite direction to the optical axis and a step facing the optical axis, and the step facing an opposite direction to the optical axis and the step facing the optical axis satisfy the following expressions (1) and (2), where d11 is an amount of the step facing the opposite direction to the optical axis, d12 is an amount of the step facing the optical axis, and n is a refractive index of the objective lens at the wavelength λ1:

$$0.6 \cdot (\lambda 1/(n-1)) < d11 < 1.5 \cdot (\lambda 1/(n-1)), \quad (1)$$

$$0.6 \cdot (\lambda 1/(n 1)) < d12 < 1.5 \cdot (2\lambda 1/(n-1)). \quad (2)$$

These embodiments enable to record and/or reproduce information compatibly for the three types of optical discs of BDs, DVDs, and CDs with a common objective lens. Further, these embodiments provide reduced-height steps arranged on the objective lens, which provides an objective lens with small manufacturing error, a small loss in light amount, and stable diffraction efficiency even when a wavelength of an incident light changes. Further, an objective lens with well-balanced light utilizing efficiency so as to maintain high light utilizing efficiency for each of the three types of optical disc of BDs, DVDs, and CDs, can be provided.

Additionally, those embodiments do not exhibit wavelength characteristic which is excessively under-corrected or is excessively over-corrected but exhibit wavelength characteristic which is under-corrected to a proper degree. Thereby, an aberration caused when a temperature of an optical pickup apparatus raises can be controlled to be small, which enables to provide an objective lens capable of maintaining a stable performance even under a temperature change.

In the above objective lens, the step facing an opposite direction to the optical axis and the step facing the optical axis preferably satisfy the expressions (1) and (2) in all over the central area.

It is more preferable that the step facing an opposite direction to the optical axis and the step facing the optical axis satisfy the following expressions (1') and (2'):

$$0.9 \cdot (\lambda 1/(n-1)) < d11 < 1.5 \cdot (\lambda 1/(n-1)), \quad (1')$$

$$0.9 \cdot (\lambda 1/(n-1)) < d12 < 1.5 \cdot (\lambda 1(n-1)). \quad (2')$$

In the above objective lens, the step facing an opposite direction to the optical axis and the step facing the optical axis preferably satisfy the expressions (1') and (2') in all over the central area.

In the objective lens, it is preferable that the number of steps facing an opposite direction to the optical axis is more than the number of steps facing the optical axis, in the central area.

When information is recorded and/or reproduced for the third optical disc, the third light flux entering the first optical path difference providing structure is emitted mainly as diffracted light which is necessary and is used for recording and/or reproducing information, and partially as diffracted light which is unwanted and is not used for recording and/or for reproducing information. By making a pitch of the first optical path difference providing structure small, or by preferably increasing the number of steps facing the opposite direction to the optical axis to makes the pitch small, a light converging position of the unwanted diffracted light can be located away from a light converging position of the necessary diffracted light Thereby, a detection error caused by unwanted diffracted light converged on a light-receiving element, can be avoided, which is preferable. Further, such the structure also preferable in a way that a working distance for CDs is more easily ensured satisfactory.

In the objective lens, when any one of the first light flux, the second light flux and the third light flux whose wavelength is longer than the corresponding wavelength among the first wavelength, the second wavelength, and the third wavelength enters the objective lens, the objective lens preferably generates a third order spherical aberration and a fifth order spherical aberration each of which is under-corrected.

By employing the structure achieving the above, an aberration caused when a temperature in an optical pickup apparatus raises, can be reduced. It enables to provide an objective lens capable of maintaining a stable performance even under the temperature changes, when the objective lens is made of plastic.

The objective lens preferably satisfies the following expression.

$$1.0 \leq d/f \leq 1.5 \quad (3)$$

In the expression, d is a thickness (mm) of the objective lens along the optical axis and f is a focal length (mm) of the objective lens tor the first light flux.

When an objective lens suitable to an optical disc with high NA using a short wavelength, such as BDs, is provided, astigmatism and decentration coma can be easily caused in the objective lens. However, the above structure can control a generation of the astigmatism and decentration coma to be small When the objective lens satisfies the expression (3), the objective lens becomes a thick objective lens whose thickness along the optical axis is large, thereby, a working distance for recording and/or reproducing information for CD, tends to be short. However, the objective lens of the embodiment provides the first optical path providing structure to sufficiently secure the working distance. Therefore, the effects of the present invention becomes significantly.

The objective lens preferably generates a longitudinal chromatic aberration of 0.9 μm/nm or less.

The inventor, as a result of earnest and extensive study, has come to consider to strengthen a negative power in a basic structure, in order to secure a larger working distance for CD. In such case, by making a pitch of a structure generating a diffracted light with an odd diffraction order when the objective lens works for BD, to be small, the negative power of the basic structure can be strengthened. However, the inventor has also found that a trade-off characteristics that a longitudinal chromatic aberration becomes relatively large in place of the strengthened negative power. On the other hand, some semiconductor lasers can have a broadened wavelength spectrum (namely, have a wavelength band which extends toward upward and downward from the reference wavelength) because of superposition of high frequency current. The inventor has found a problem that, when a light flux whose wavelength spectrum is broadened enters an objective lens in which longitudinal chromatic aberration is relatively large, a side-lobe in a profile of a converged spot increases and cross talk is easily caused.

Therefore, by forming a first optical path difference providing structure, especially the first basic structure, with a diffraction pitch such that the longitudinal chromatic aberration is controlled to be 0.9 μm/nm or less, generation of the cross talk can be effectively controlled even when a semiconductor laser with broadened wavelength spectrum because of superposition of high frequency current, is employed.

In the objective lens, it is preferable that the longitudinal chromatic aberration is 0.4 μm/nm or more.

According to the above embodiment the diffraction pitch of the first basic structure does not become excessively small, and a sufficient working distance for CDs can be secured.

The objective lens preferably satisfies the following expression.

$$0.002 \leq p/fl \leq 0.004 \quad (23)$$

In the expression, p is a minimum pitch in the first optical path difference providing structure in the central area and fl is a local length of the objective lens for at the first wavelength.

By satisfying the above expression, the objective lens can provide a restricted longitudinal chromatic aberration with securing a satisfactory working distance for CD, and can effectively control a generation of cross talk even when a semiconductor laser with a broadened wavelength spectrum because of surperposition of high frequency current, is employed. Further, a converging position of the unwanted diffracted light can be located away from a converging position of the necessary diffracted light and it avoids a detection error caused because the unwanted light is converged onto a light-receiving element.

In the objective lens, it is preferable that the first optical path difference providing structure in the central area has a minimum pitch of 15 μm or less.

When information is recorded and/or reproduced for the third optical disc, the third light flux entering the first optical path difference providing structure is emitted mainly as diffracted light which is necessary and is used for recording and/or reproducing information, and partially as diffracted light which is unwanted and is not used for recording and/or reproducing information. By making a pitch of the first optical path difference providing structure small, or by preferably making a pitch of the first basic structure small, a light converging position of the unwanted diffracted light can be located away from a light converging position of the necessary diffracted light. Thereby, a detection error caused by unwanted diffracted light converged on a light-receiving element, can be avoided, which is preferable.

The objective lens preferably satisfies the following expressions (4), (5), and (6).

$$-0.01 < m1 < 0.01 \quad (4)$$

$$-0.01 < m2 < 0.01 \quad (5)$$

$$-0.01 < m3 < 0.01 \quad (6)$$

In these expressions, m1 is a magnification of the objective lens when the first light flux enters the objective lens, m2 is a magnification of the objective lens when the second light flux enters the objective lens, and m3 is a magnification of the objective lens when the third light flux enters the objective lens.

Another embodiment of the present invention is an optical pickup apparatus comprising: a first light source for emitting a first light flux having a first wavelength $\lambda 1$; a second light source for emitting a second light flux having a second wavelength $\lambda 2$ ($\lambda 2 > \lambda 1$); a third light source for emitting a third light flux having a third wavelength $\lambda 3$ ($\lambda 3 > \lambda 2$); and the above objective lens. The optical pickup apparatus records and/or reproduces information with the first light flux on an information recording surface of a first optical disc having a protective substrate with a thickness t1, records and/or reproduces information with the second light flux on an information recording surface of a second optical disc having a protective substrate with a thickness t2 (t1<t2), and records and/or reproduces information with the third light flux on an information recording surface of a third optical disc having a protective substrate with a thickness t3 (t2<t3).

Another embodiment of the present invention is an optical information recording and reproducing apparatus comprising the above optical pickup apparatus.

An optical pickup apparatus relating to the present invention, comprises at least three light sources: a first light source, a second light source, and a third light source. Further, the optical pickup apparatus comprises a light-converging optical system for converging a first light flux onto an information recording surface of a first optical disc, converging a second light flux onto an information recording surface of a second optical disc, and converging a third light flux onto an information recording surface of a third optical disc. The optical pickup apparatus further comprises an light-receiving element for receiving a reflection light flux from the information recording surface of each of the first optical disc, second optical disc, and third optical disc.

The first optical disc comprises a protective substrate with a thickness of t1 and an information recording surface. The second optical disc comprises a protective substrate with a thickness of t2 (t1<t2) and an information recording surface. The third optical disc comprises a protective substrate with a thickness of t3 (t2<t3) and an information recording surface. It is preferable that the first optical disc represents a BD, the second optical disc represents a DVD, and the third optical disc represents a CD, but optical discs are not limited to those. Each of the first optical disc, the second optical disc, and the third optical disc may be a multilayer optical disc with, a plurality of information recording surfaces.

In the present specification, BD represents a generic name of optical discs belonging to BD group having a protective substrate with a thickness in the range of about 0.05 to 0.125 mm, for which information is recorded/reproduced with a light flux with a wavelength of about 390 to 415 nm by an objective lens with NA of about 0.8 to 0.9. BDs include such a disc including only a single information recording layer and such a disc including two or more information recording layers. Further, DVD in the present specification represents a generic name of optical discs belonging to DVD group with a protective substrate of about 0.6 mm for which information is recorded/reproduced by an objective lens with NA in the range of about 0.60 to 0.67. DVDs include DVD-ROM, DVD-Video, DVD-Audio, DVD-RAM, DVD-R, DVD-RW, DVD+R and DVD+RW. In the present specification, CD represents a generic name of optical discs belonging to CD group having a protective substrate of about 1.2 mm, for which information is recorded and/or reproduced by an objective lens with NA in the range of about 0.45 to 0.51. CDs include CD-ROM, CD-Audio, CD-Video, CD-R and CD-RW.

Among these optical discs, a high density optical disc provides the highest recording density. DVD and CD provide the second highest recording density, the third highest recording density, respectively.

Thicknesses t1, t2, and t3 of the protective substrates preferably satisfy the following conditional expressions (7), (8), and (9), but the thicknesses are not limited to those. Herein, a thickness of a protective substrate means a thickness of a protective substrate formed on a top of an optical disc. Namely, it means a thickness of a protective substrate measured from atop of an optical disc to an information recording surface placed at the closest position to the top.

$$0.050 \text{ mm} \leq t1 \leq 0.125 \text{ mm} \tag{7}$$

$$0.5 \text{ mm} \leq t2 \leq 0.7 \text{ mm} \tag{8}$$

$$1.0 \text{ mm} \leq t3 < 1.3 \text{ mm} \tag{9}$$

In the present specification, each of the first light source, the second light source, and the third light source is preferably a laser light source. A semiconductor laser, and a silicon laser are preferably used for the laser light source. First wavelength $\lambda 1$ of a first light flux emitted from the first light source, second wavelength $\lambda 2$ ($\lambda 2 > \lambda 1$) of a second light flux emitted from the second light source, third wavelength $\lambda 3$ ($\lambda 3 > \lambda 2$) of a third light flux emitted from the third light source, are preferable to satisfy the following expressions (10) and (11).

$$1.5 \cdot \lambda 1 < \lambda 2 < 1.7 \cdot \lambda 1 \tag{10}$$

$$1.8 \cdot \lambda 1 < \lambda 3 < 2.0 \cdot \lambda 1 \tag{11}$$

When a BD is employed as the first optical disc, tie wavelength $\lambda 1$ of the first light source is preferably from 350 nm or more, and 440 nm or less, and more preferably from 390 nm or more, and 415 nm or less. When a DVD is employed as the second optical disc, the second wavelength $\lambda 2$ of the second light source is preferably from 570 nm or more, and 680 nm or less, and is more preferably from 630 nm or more, and 670 nm or less. When a CD is employed for the third optical disc, the third wavelength $\lambda 3$ of the third light source is preferably from 750 nm or more, and 880 nm or less, and is more preferably from 760 nm or more, and 820 nm or less.

When a laser light source in which superposition of high frequency current is carried out is employed, it can entail a risk that cross talk is caused. However, by controlling longitudinal chromatic aberration to be 0.9 μm/nm or less, such the laser light source in which superposition of high frequency current is carried out can be preferably employed because a generation of cross talk is restricted. Further, when a laser light source emitting a light flux with a wavelength spectrum whose full width at the half maximum (a full width of a wavelength spectrum at a half of the maximum value of the spectrum) is 0.5 nm or more, is employed it can entails larger problem such as cross talk. However, by controlling longitudinal chromatic aberration to be 0.9 μm/nm or less, such the laser light source can be preferably employed because a generation of cross talk is restricted.

Further, at least two light sources of the first light source, the second light source, and the third light source may also be unitized. The unitization means fixing and housing, for example, the first light source and the second light source into one package. Additionally to the light sources, a light-receiving element described below can be unitized.

As a light-receiving element, a photodetector such as a photodiode is preferably used. Light reflected on an information recording surface of an optical disc enters the light-receiving element, and signal outputted from the light-receiving element is used for obtaining the read signal of the information recorded in each optical disc. Further, change in the light amount of the spot on the light-receiving element caused because of the change in the spot shape and the change in the spot position, is detected to conduct the focus detection and the tracking detection. The objective lens can be moved based on these detections for focusing and tracking of the objective lens. The light-receiving element may be composed of a plurality of photodetectors. The light-receiving element may also have a main photodetector and secondary photodetector. For example, the light-receiving element can be provided with a main photodetector which receives a main light used for recording and reproducing information, and with two secondary photodetectors positioned on both sides of the main photodetector so as to receive secondary light for tracking adjustment by the two secondary photodetectors. Alternatively, the light receiving-element may be provided with a plurality of light-receiving elements corresponding to respective light sources.

The light-converging optical system comprises an objective lens. The light-converging optical system preferably comprise a coupling lens such as a collimation lens other than the objective lens. The coupling lens is a single lens or a group of lenses which is arranged between an objective lens and a light source and changes divergent angle of a light flux. The collimation lens is one type of coupling lenses, and is a lens converting an incident light flux into a parallel light flux. In the present specification, an objective lens is an optical system which is arranged to face an optical disc in the optical pickup apparatus, and has the function which converges a light flux emitted from the light source onto an information recording surface of an optical disc. The objective lens may be formed of a plurality of lenses and/or optical elements. Alternatively, the objective lens may be a single lens. Preferably, the objective lens is formed of a single lens. A biconcave single lens cam preferably employed as the objective lens. The objective lens may also be a glass lens, a plastic lens or a hybrid lens in which an optical path difference providing structure is formed on the glass lens out of resin such as photo-curable resin, UV-curable resin, and thermosetting resin. When the objective lens has a plurality of lenses, a combination of a glass lens and a plastic lens can be used tor the objective lens. When the objective lens has of a plurality of lenses and/or optical elements, a combination of an optical element in flat plate shape having an optical path difference providing structure; and an aspheric surface lens, which may not have a optical path difference providing structure, can be used for the objective lens. The objective lens preferably comprises a refractive surface which is an aspheric surface. Further, in the objective lens, abase surface where the optical path difference providing structure is provided, is preferably an aspheric surface.

When the objective lens is a glass lens, a glass material used for the glass lens preferably has a glass transition point Tg of 500° C. or less, or preferably of 400° C. or less. By using the glass material whose glass transition point Tg is 500° C. or less, the material can be molded at a comparatively low temperature. Therefore, the life of molds can be prolonged. As an example of the glass material whose glass transition point Tg is low, there are K-PG325 and K-PG375 (both are trade names) made by SUMITA Optical glass, Inc.

A glass lens has generally larger specific gravity than a resin lens. Therefore, an objective lens made of a glass lens has larger weight and apply a larger burden to an actuator which drives the objective lens. Therefore, when a glass lens is employed for the objective lens, a glass material having small specific gravity is preferably used for the objective lens. Specifically, the specific gravity is preferably 4.0 or less, and is more preferably 3.0 or less.

Further, one of important physical values when molding a glass lens, is a linear expansion coefficient "a". Even if a material with glass transition point Tg of 400° C. or less is selected, its temperature difference from a room temperature is still larger than that of plastic materials. When a glass material with a large linear expansion coefficient is molded to form a lens, the lens can easily have cracks when the temperature is lowered. It is preferable that the linear expansion coefficient of a glass material is 200 ($10^{-7}$/K) or less and is more preferable that it is 120 ($10^{-7}$/K) or less.

When the objective lens is a plastic lens, it is preferable that alicyclic hydrocarbon polymer such as cyclic olefin resin is employed for the objective lens. Among the materials, a preferable resin has: refractive index within the range of 1.54 to 1.60 at the temperature 25° C. and wavelength 405 nm, and ratio of refractive index change dN/dT (°C.$^{-1}$) which is within the range of $-20 \times 10^{-5}$ to $-5 \times 10^{-5}$ (more preferably, $-10 \times 10-5$ to $-8 \times 10^{-5}$), where the ratio of refractive index change is caused due to the temperature change within the temperature range of $-5°$ C. to 70° C. at the wavelength 405 nm. Further, when a plastic lens is employed for the objective lens, it is preferable that a plastic lens is also employed for the coupling lens.

Preferable examples of alicyclic hydrocarbon polymer will be described below.

First preferable example is a resin composition comprising block copolymer including polymer block [A] containing a repeating unit [1] represented by the following Formula I, and polymer block [B] containing the repeating unit [1] represented by the Formula I and a repeating unit [2] represented by the following Formula II and/or a repeating unit [3] represented by the Formula II. The block copolymer satisfies a relationship of a>b, where a is a mol fraction (mol %) of the repeating unit [1] in the polymer block [A] and b is a mol fraction (mol %) of the repeating unit [1] in the polymer block [B].

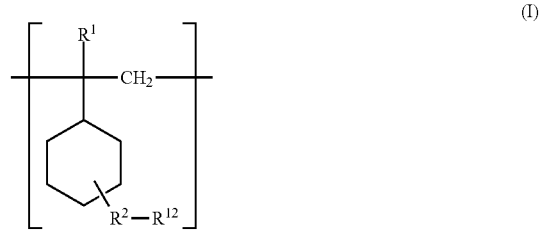

(I)

In Formula I, $R^1$ represents a hydrogen atom or an alkyl group having a carbon number of 1-20, $R^2$-$R^{12}$ each independently represent a hydrogen atom, an alkyl group having a carbon number of 1-20, hydroxyl group, an alkoxy group having a carbon number of 1-20 or a halogen group.

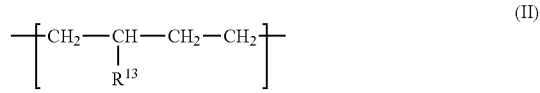

(II)

In Formula 2, $R^{13}$ represents a hydrogen atom or a alkyl group having a carbon number of 1-20.

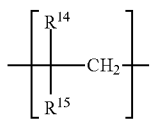

(III)

In Formula 3, $R^{14}$ and $R^{15}$ each independently represent a hydrogen atom or an alkyl group having a carbon number of 1-20.

Second preferable example is a resin composition containing polymer (A) obtained by an addition polymerization at least of α-olefin with 2-20 carbon atoms and monomer composition consisting of cyclic olefin represented by the following general formula (IV), and containing polymer (B) obtained by an addition polymerization of α-olefin with 2-20 carbon atoms and monomer composition containing cyclic olefin represented by following general formula (V).

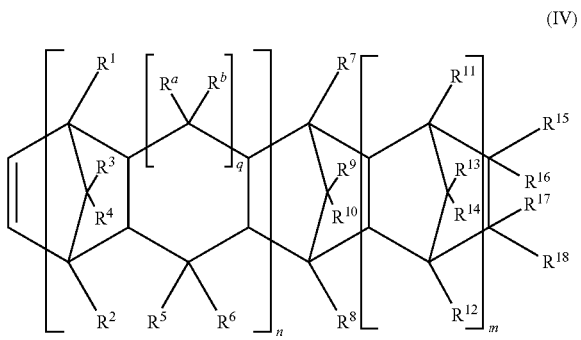

(IV)

In the general formula IV, n or is 0 or 1, m is 0 or a positive integer, and q is 0 or 1. $R^1$ to $R^{18}$ and $R^a$ and $R^b$ each independently represent a hydrogen atom, a halogen atom or a hydrocarbon group. As for $R^{15}$-$R^{18}$, each may be bonded to another to form a monocyclic or polycyclic group, and the monocyclic or polycyclic group formed in this manner may have double bonds. Also an alkylidene group may also be formed with $R^{15}$ and $R^{16}$ or $R^{17}$ and $R^{18}$.

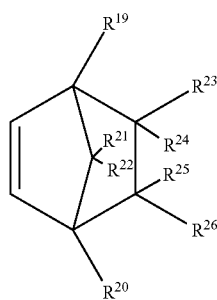

(V)

In the general formula V, $R^{19}$-$R^{26}$ each independently represent a hydrogen atom, a halogen atom or a hydrocarbon group.

The following additives may be added to the resin material in order to add an extra property to the resin material.
(Additives)

It is preferable that at least one type of additive selected from the group of phenol type stabilizer, hindered amine type stabilizer, phosphor type stabilizer, and sulfur type stabilizer.

By properly selecting and adding these stabilizers, cloudiness caused when the material is continuously irradiated with a light flux with a short wavelength such as 405 nm, and fluctuation of optical property such as fluctuation of refractive index, can be controlled more properly.

For preferable phenol type stabilizer, usually known ones ca be employed. For example, the followings are cited acrylate compounds described in JP-A Nos. 63-179953 and 1-168643 such as 2-t-butyl-6(3-t-butyl-2-hydroxy-5-methyl-benzyl)-4-methylphenyl acrylate and 2,4-di-t-amyl-6-(1-(3,5-di-t-amyl-2-hydroxyphenyl)ethyl)phenyl acrylate; an alkyl-substituted phenol compound such as octadecyl-3-(3,5-di-t-butyl-4-hydroxyphenyl)propionate, 2,2'-methylene-bis(4-methyl-6-t-butylphenol), 1,1,3-tris(2-methyl-4-hydroxy-5-t-butylphenyl)butane, 1,3,5-trimethyl-2,4,6-tris(3,5-di-t-butyl-4-hydroxybentyl)benzene, tetrakis(methylene-3-(3'-5'-di-t-butyl-4'-hydroxyphenylpropioriate)methane, namely pentaerythrimethyl-tetrakis(3-(3,5-di-t-butyl-4-hydroxyphenylpropionate) and triethylene glycol bis-(3-(3-t-butyl-4-hydroxy-5-methylphenyl)-propionate; and a triazine group-containing phenol compound such as 6-(4-hydroxy-3,5-di-t-butylanilino-1,3,5-triazine, 4-bisoctylthio-1,3,5-triazine and 2-octylthio-4,6-bis-(3,5-di-t-4-butyl-4-oxyanilino)-1,3,5-triazine.

For preferable hindered amine type stabilizer, the following samples are cited bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidy)sebacate, bis(1,2,2,6,6-pentamethyl-4-piperidyl)2-(3,5-di-t-butyl-4-hydroxybenzyl)-2-butylmalonate, bis(1-acroyl-2,2,6,6-tetramethyl-4-piperidyl)2,2-bis(3,5-di-t-butyl-4-hydroxybenzyl)-2-butylmalonate, bis(1,2,2,6,6-pentamethyl-4-piperidyl decanedioate, 2,2,6,6-tetramethyl-4-piperdyl methacrylate,4-[3-(3,5-di-t-butyl-4hydroxyphenyl)propionyloxy]-1-[2-(3,5-di-t-butyl-1-4-hydroxyphenyl)propionyloxy)ethyl]-2,2,6,6-tetramethyl piperidine, 2-methyl-2-(2,2,6,6-tetramethyl-4-piperidyl) amino-N-(2,2,6,6-tetramethyl-4-piperidyl)propionamide, tetrakis(2,2,6,6-tetramethyl-4-piperidyl)1,2,3,4-butanetetra-carboxylate, tetrakis(1,2,2,6,6-pentamethyl-4-piperidyl)1,2,3,4-butanetetracarboxylate.

As for preferable phosphor type stabilizer, ones usually employed in the field of resin industry can be employed without any limitation. For example, the followings are cited: monophosphite compounds such as triphenyl phosphate, diphenylisodecyl phosphate, phenylisodecyl phosphate, tris (nonylphenyl) phosphate, tris(dinonylphenyl) phosphate, tris (dinonylphenyl)phosphate, tris(2,4-di-t-butylphenyl)phosphate, and 10-(3,5-di-t-butyl-4-hydroxybenzyl)-9,10-dihydro-9-oxa-10-Phosphaphenanthrene-10-oxide; and diphosphite compounds such as 4,4'-butylidene-bis(3-methyl-6-t-butylphenyl-di-tridecyl phosphate and 4,4'-isopropyridene-bis(phenyl-di-alkyl($C_{12}$ to $C_{15}$)phosphate). Among them, the monophosphite compounds are preferable and tris (nonylphenyl) phosphate, tris(dinonylphenyl) phosphate and tris(2,4,-di-t-butylphenyl) phosphate are particularly preferable.

As for preferable sulfur type stabilizer, the following examples are cited: dilauryl 3,3-thiodipropionate, dimyrystyl 3,3'-thiodipropionate, distearyl 3,3-thiodipropionate, laurystearyl 3,3-dithioproponate, pentaerythrytol-tetrakis-(β-laurylstearyl-thio-propionate and 3,9-bis-(2-dodecylthioethyl)-2,4,8,10-tetrakispiro[5,5]-undecane.

The adding amount of each stabilizer is optionally decided within the range in which the object of the invention is not vitiated; it is usually from 0.01 to 2 parts by weight and preferably from 0.01 to 1 part by weight to 100 parts by weight of the alicyclic hydrocarbon polymer.

(Surfactant)

Surfactant is a compound having a hydrophilic group and a hydrophobic group in the identical molecule. The surfactant inhibits cloudiness of resin composition by adjusting the speed of moisture adhesion to the resin surface and of moisture vaporization from the foregoing surface.

Specific examples of the hydrophilic group in the surfactant include a hydroxy group, a hydroxyalkyl group having at least one carbon atom, a hydroxyl group, a carbonyl group, an ester group, an amino group, an amide group, an ammonium salt, thiol, sulfate, phosphate, and a polyalkyleneglycol group. Herein, the amino group may be any of a primary amino group, a secondary amino group and a tertiary amino group.

Specific examples of the hydrophobic group in the surfactant include an alkyl group having six carbon atoms, a silyl group including an alkyl group having six carbon atoms, and a fluoroalkyl group having six carbon atoms. Herein, the alkyl group having six carbon atoms may possess an aromatic ring as a substituent. Specific examples of the alkyl group include hexyl, heptyl, octyl, nonyl, decyl, undecenyl, dodecyl, tridecyl, tetradecyl, myristyl, stearyl, lauryl, palmityl, and cyclohexyl. As the aromatic ring, a phenyl group can be provided. This surfactant may possess at least one hydrophilic group and one hydrophobic group each in the identical molecule, or may possess two hydrophilic group and two hydrophobic group each.

Further specific examples of such the surfactant include myristyl diethanolamine, 2-hydroxyethyl-2-hydroxyldodexylamine, 2-hydroxyehtyl-2-hydroxytridecylamine, 2-hydroxyehtyl-2-hydroxytetradecylamine, pentaerythritol-monostearate, pentaerythritoldistearate, pentaerythoritoltristearate, di-2-hydroxyethoyl-2-hydroxydodecylamine, alkyl(8-18 carbon atoms) benzyldimethoylammonium chloride, ethylene bis alkyl (8-18 carbon atoms) amide, stearyl diethanolamide, lauryl diethanolamide, myristyl diethanolamide, and palmityl diethianolamide. Of these, amine compounds and amide compounds having a hydroxyalkyl group are preferably used In the present embodiment, these compounds may be used in combination of at least two kinds.

The adding amount of surfactant is preferably from 0.01 to 10 parts by weight to 100 parts by weight of the alicyclic hydrocarbon polymer from the viewpoint of efficient restriction of cloudiness of a product caused by fluctuation of temperature and humidity and the viewpoint of maintain the high light transmittance of the product. The addition amount of the surfactant is more preferably 0.05-5 parts by weight, with respect to 100 parts by weight of the alicyclic hydrocarbon based polymer, and further more preferably 0.3-3 parts by weight (Plasticizer)

Plasticizer is added as in need to adjust melt index of the copolymer.

As for plasticizer, usually known ones ca be employed. For example, the followings are cited bis(2-ethylhexyl)adipate, bis(2-budoxyehtyl)adipatc, bis(2-ethylexyl)azelate, dipropyleneglycol dibenzoate, tri-n-butyl citrate, tri-n-butylacetyl citrate, epoxidized soybean oil, 2-ethylhexyl epoxidized tall oil, chlorinated paraffin, tri-2-ethylhexyl phosphate, tricresyl phosphate, t-butylphenyl phosphate, tri-2-ethylhexyldiphenyl phosphate, diburyl phtalate, diisohexyl phthalate, diheptyl phthalate, dinonyl phthalate, diundecyl phthalate, di-2-ethylhexyl phthalate, diisononyl phthalate, diisodecyl phthalate, ditridecyl phthalate, burylbenzyl phthalate, disyclohexyl phthalate, bis(2-ethylhexyl)sebacate, (tri-2-ethylhexyl)trimellitic acid, Santicizer 278, Paraplex G40, Drapex 334F, Plastolein 9720, Mesamoll DNODP-610, and HB-40. Selection of placticizer and its amount of addition can be determined arbitrarily so long as transmittance and durability against change in the environment of the copolymer are not degraded.

As the resin, cyclcoolefin resin is employed suitably. Specifically, ZEONEX by ZEON CORPORATION, APEL by Mitsui Chemicals, Inc., TOPAS made from TOPAS Advanced Polymers, ARTON by JSR Corporation, are cited as preferable examples.

Further, it is preferable that a material which forms the objective lens, has the Abbe number of 50 or more.

An objective lens of the present embodiment will be described below. The objective lens includes at least a central area, an intermediate area surrounding the central area, and a peripheral area surrounding the intermediate area, on at least one optical surface. It is preferable that the central area includes the optical axis of the objective lens. However, a small area including the optical axis may be provided as an unused area or an area for a special purpose, and the central area may be provided to surround the small area. The central area, intermediate area, and peripheral area are preferably formed on one optical surface. As shown in FIG. 1, it is preferable that the central area CN, intermediate area MD, peripheral area OT are provided on the same optical surface concentrically around the optical axis. Further, a first optical path difference providing structure is provided in the central area of the objective lens. A second optical path difference providing structure is provided in the intermediate area. The peripheral area may be a refractive surface, or a third optical path difference providing structure may be provided in the peripheral area. It is preferable that each of the central area, intermediate area, and peripheral area adjoins to the neighboring area, however, there may be slight gaps between the adjoining areas.

The central area of the objective lens can be considered as a common area for the first, second and third optical discs to be used for recording and/or reproducing information for the first optical disc, the second optical disc, and the third optical disc. In other words, the objective lens converges a first light flux that passes through the central area so that recording and/or reproducing of information may be conducted on an information recording surface of the first optical disc, converges a second light flux that passes through the central area so that recording and/or reproducing of information may be conducted on an information recording surface of the second optical disc, and converges a third light flux that passes through the central area so that recording and/or reproducing of information may be conducted on an information recording surface of the third optical disc. Further, it is preferable that a first optical path difference providing structure arranged in the central area corrects spherical aberration caused by a difference between thickness t1 of a protective substrate of the first optical disc and thickness t2 of a protective substrate of the second optical disc, and/or spherical aberration caused by a difference in wavelength between the first light flux and the second light flux, for the first light flux and the second light flux both passing through the first optical path difference providing structure. Further, it is preferable that the first optical path difference providing structure corrects spherical aberration caused by a difference between thickness t1 of a protective substrate of the first optical disc and thickness t3 of a protective substrate of the third optical disc and/or spherical aberration caused by a wavelength difference between the first light flux and the third light flux, for the first light flux and the third light flux.

Figure 2:
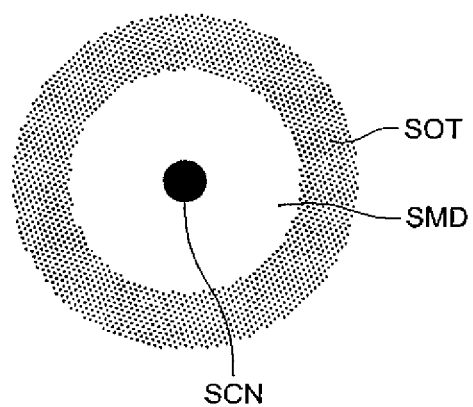
FIG. 2 is a diagram showing how a third light flux which has passed through the objective lens forms a spot on an in information recording surface of a third optical disc.

An intermediate area of the objective lens can be considered as a common area for the first and second optical discs which are used for recording and/or reproducing for the first optical disc and the second optical disc, but are not used for recording and/or reproducing for the third optical disc. Namely, the objective lens converges the first light flux that passes through the intermediate area so that recording and/or reproducing of information may be conducted on an information recording surface of the first optical disc, and converges the second light flux that passes through the intermediate area so that recording and/or reproducing of information may be conducted on an information recording surface of the second optical disc. On the other hand, the objective lens does not converge the third light flux that passes through the intermediate area so that recording and/or reproducing of information may be conducted on an information recording surface of the third optical disc. It is preferable that the third light flux that passes through the intermediate area of the objective lens forms flare light on an information recording surface of the third optical disc. As shown in FIG. 2, when a spot is formed by the third light flux that has passed through the objective lens onto an information recording surface of the third optical disc, the spot preferably includes a central spot portion SCN whose light density is high, an intermediate spot portion SMD whose light density is lower than that in the central spot portion, and a peripheral spot portion SOT whose light density is higher than that in the intermediate spot portion and is lower than that in the central spot portion. The central spot portion is used for recording and/or reproducing of information of an optical disc, while, the intermediate spot portion and the peripheral spot portion are not used for recording and/or reproducing of information of the optical disc. In the foregoing, the peripheral spot portion is called flare light. However, also in the case that the spot includes just the central spot portion and the peripheral spot portion but does not include the intermediate spot portion around the central spot portion, namely, in the case that a spot which is large in size and has weak light intensity is formed around a converged spot, the peripheral spot portion can be called a flare light. In other words, it can be said that it is preferable that the third light flux forms a peripheral spot portion on an information recording surface of the third optical disc.

A peripheral area of the objective lens can be considered as an exclusive area for the first optical disc that is used for recording and/or reproducing for the first optical disc but is not used for recording and/or reproducing for the second optical disc and the third optical disc. Namely, the objective lens converges a first light flux that passes through the peripheral area so that recording and/or reproducing of information may be conducted on an information recording surface of the first optical disc. On the other hand, the objective lens does not converge the second light flux that passes through the peripheral area so that recording and/or reproducing of information may be conducted on an information recording surface of the second optical disc, and it does not converge the third light flux that passes through the peripheral area so that recording and/or reproducing of information maybe conducted on an information recording surface of the third optical disc. It is preferable that the second light flux and the third light flux which pass through the peripheral area of the objective lens form flare light on information recording surfaces of the second and third optical discs. In other words, it is preferable that the second light flux and the third light flux which have passed the peripheral area of the objective lens form the peripheral spot portion.

It is preferable that first optical path difference providing structures are provided on the area that is 70% or more of the central area of the objective lens, and it is more preferable that the area for the first optical path difference providing structures is 90% or more. What is more preferable is that the first optical path difference providing structures are provided on the whole surface of the central area. It is preferable that second optical path difference providing structures are provided on the area that is 70% or more of the intermediate area of the objective lens, and it is more preferable that the area for the second optical path difference providing structures is 90% or more. What is more preferable is that the second optical path difference providing structures are provided on the whole surface of the intermediate area. When the peripheral area has thereon the third optical path difference providing structure, if is preferable that third optical path difference providing structures are provided on the area that is 70% or more of the peripheral area of the objective lens, and it is more preferable that the area for the third optical path difference providing structures is 90% or more. What is more preferable is that the third optical path difference providing structures are provided on the whole surface of the peripheral area.

Incidentally, the optical path difference providing structure mentioned in the present specification is a general term for the structure that provides an optical path difference to an incident light flux. The optical path difference providing structure also includes a phase difference providing structure that provides a phase difference. Further, the phase difference providing structure includes a diffractive structure. It is preferable that the optical path difference providing structure of the present embodiment is a diffractive structure. The optical path difference providing structure comprises a step, and it preferably comprises a plurality of steps. Due to the step or steps, an optical path difference and/or a phase difference is provided to an incident light flux. An optical path difference to be provided by the optical path difference providing structure may either be a multiple of an integer of a wavelength of an incident light flux in terms of a length or be a multiple of a non-integer of a wavelength of an incident light flux. The steps may either be arranged with intervals periodically in the direction perpendicular to the optical axis, or be arranged with interval non-periodically in the direction perpendicular to the optical axis. When the objective lens equipped with an optical path difference providing structure is an aspheric single lens, an incident angle of a light flux for the objective lens varies depending on a height from the optical axis, thus, an amount of step of the optical path difference providing structure is slightly different from others for each ring-shaped zone. For example, when the objective lens is a convex single lens with an aspheric surface, it is a general trend that an amount of step of the optical path difference providing structure grows greater as a position in the optical path difference providing structure becomes more distant from the optical axis, even in the case of the optical path difference providing structure that provides the constant optical path difference.

Further, a diffractive structure mentioned in the present specification is a general term for a structure that comprises a step or steps, for providing a function to converge a light flux or to diverge a light flux by a diffraction effect For example, a diffractive structure can be formed by plural unit forms which are arranged around the optical axis, such that, when a light flux enters the respective unit forms, a wavefront of the transmitted light flux is shifted at every adjoining ring-shaped zone to form a new wavefront by which light is converged or diverged. The diffractive structure preferably includes plural steps, and the steps may either be arranged with intervals periodically in the direction perpendicular to the optical axis, or be arranged with intervals non-periodically or the direction perpendicular to the optical axis. When an objective lens with a diffractive structure is provided as an aspheric single lens, an angle of a light flux entering the objective lens varies depending on a height from the optical axis. Thereby, an amount of step of the diffractive structure slightly varies on each ring-shaped zone. For example, when the objective lens is a convex single lens including an aspheric surface, it is a general trend that an amount of step grows greater as a position of the step is more distant from the optical axis, even in a diffractive structure which generates a diffracted light fluxes with the same diffraction order.

Incidentally, it is preferable that an optical path difference providing structure comprises a plurality of ring-shaped zones which are formed in concentric circles whose centers are on the optical axis. Further, the optical path difference providing structure can take generally various sectional forms (sectional forms on the surface including an optical axis) which are classified roughly into a blaze-type structure and a staircase structure in terms of a sectional form including the optical axis.

Figure 3A:
FIGS. 3a-3d are sectional views taken along the optical axis, showing an example of an optical path difference providing structure.
Figure 3B:
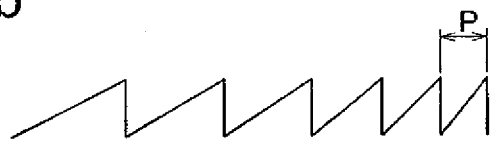

The blaze-type structure has a form whose sectional form including the optical axis of an optical element having an optical path difference providing structure are in a serrated form, as shown in FIGS. 3a and 3b. In the example shown in FIGS. 3a and 3b, it is assumed that the upward of the sheet is the light source side, and the downward of the sheet is the optical disc side, and that the optical path difference providing structure is formed on a plane representing a base aspheric surface. In the blaze-type structure, a length of one blaze unit in the direction perpendicular to the optical axis is called pitch P (see FIGS. 3a and 3b). Further, a length of a step in the direction that is in parallel with the optical axis of blaze is called step amount B (see FIG. 3a).

Figure 3C:
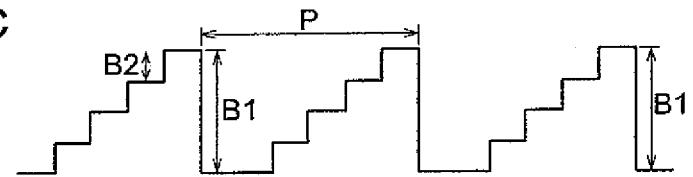
Figure 3D:
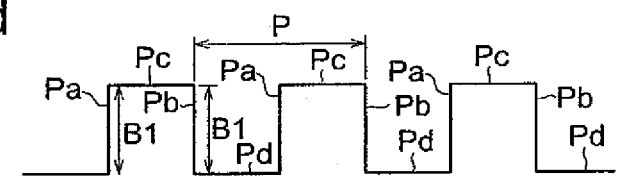

The staircase structure has a form whose sectional form including an optical axis of an optical element having an optical path difference providing structure has a plurality of small-staircase units (each being called a stair unit), as shown in FIGS. 3c and 3d. Incidentally, "V-level" mentioned the present specification means a form such that one staircase unit of the staircase structure has ring-shaped surfaces (which is sometimes called terrace surfaces) that correspond to a perpendicular direction to the optical axis (that extend in the perpendicular direction to the optical axis), where the ring-shaped surfaces are formed by being sectioned by the steps and are separated at every plural ring-shaped surfaces which are V in number. Especially, a staircase structure of 3 levels or more includes small steps and large steps.

For example, an optical path difference providing structure shown in FIG. 3c is called a 5-level staircase structure and an optical path difference providing structure shown in FIG. 3d is called a 2-level staircase structure (which is called also binary structure). A 2-level staircase structure will be explained as follows. The 2-level staircase structure includes ring-shaped zones in concentric ringed shape around the optical axis. The cross sectional form including the optical axis of the plural ring-shaped zones is provided with plural step surfaces Pa and Pb extending parallel with the optical axis, light-source-side terrace surfaces Pc each connecting light-source-side ends of the neighboring step surfaces Pa and Pb, and optical-disc-side terrace surfaces Pd each connecting optical-disc-side ends of the neighboring step surfaces Pa and Pb. The light-source-side terrace surfaces Pc and the optical-disc-side terrace surfaces Pd are arranged alternately along a direction crossing the optical axis.

Further, in the staircase structure, a length of one staircase unit in the direction perpendicular to the optical axis is called pitch P (see FIGS. 3c and 3d). Further, a length of a step in the direction that is in parallel with the optical axis is called step amount B1 and step amount B2. In the case of the staircase structure of 3 levels or more, large step amount B1 and small step amount B2 are in existent (see FIG. 3c).

Incidentally it is preferable that an optical path difference providing structure is a structure wherein a certain unit form is repeated periodically. The expression saying "a certain unit form is repeated periodically" in this case naturally includes a form wherein the same form is repeated at the same period. Further, the expression saying "a certain unit form is repeated periodically" in this case also includes a form wherein its period becomes gradually longer or becomes gradually shorter with regularity.

When an optical path difference providing structure has a blaze-type structure, it has a form that a serrated forms representing unit forms are repeated. The optical path difference providing structure may have a form that the same serrated forms are repeated as shown in FIG. 3a, or has a shape that the pitch of a serrated form becomes gradually longer or shorter at a position that advances to be further from the optical axis, as shown in FIG. 3b. In addition, The optical path difference providing structure may have a form that steps of the blaze-type structure faces the direction opposite to the optical axis (center) in a certain area, and steps of the blaze-type structure faces the optical axis (center) in the other area, and that a transition area is provided for switching the direction of the steps of the blaze-type structure. Incidentally, when employing a structure to switch the direction of the steps of the blaze-type structure on the midway as stated above, it becomes possible to enlarge a pitch of the ring-shaped zones and to control a decline of transmittance that is caused by manufacturing errors for the optical path difference providing structure.

When an optical path difference providing structure has a staircase structure, the structure can have a form in which a 5-level staircase units as shown in FIG. 3c are repeated. Further, the structure may have a form in which a pitch of a staircase units becomes gradually longer or shorter at a position that advances to be further from the optical axis.

Further, the first optical path difference providing structure and the second optical path difference providing structure may be formed on different optical surfaces of the objective lens, respectively. However, the first optical path difference providing structure and the second optical path difference providing structure are preferably formed on the same optical surface. When the third optical path difference providing structure is further provided it is preferable that the third optical path difference providing structure is formed on the same optical surface on which the first optical path difference providing structure and the second optical path difference providing structure are formed. By providing them on the same optical surface, it is possible to lessen decentration errors in manufacturing process, which is preferable. Further, it is preferable that the first optical path difference providing structure, the second optical path difference providing structure and the third optical path difference providing structure are provided on the surface of the objective lens facing the light-source side, rather than the surface of the objective lens facing the optical-disc side. In another expression, it is preferable that the first optical path difference providing structure, the second optical path difference providing structure and the third optical path difference providing structure are provided on the optical surface of the objective lens which has a smaller absolute value of the curvature radius.

Next, the first optical path difference providing structure provided on the central area will be explained. The first optical path difference providing structure is a structure such that at least a first basic structure and a second basic structure are overlapped with each other.

The first basic structure is of the blaze-type structure. The first basic structure is a blaze-type structure emits a Xth-order diffracted light flux with a larger light amount than diffracted light fluxes with any other diffraction order, when the first light flux passes through the first basic structure, emits a Yth-order diffracted light flux with a larger light amount than diffracted light fluxes with any other diffraction order, when the second light flux passes through the first basic structure, and emits a Zth-order diffracted light flux with a larger light amount than diffracted light fluxes with any other diffraction order, when the third light flux passes through the first basic structure. In this case, each of X, Y and Z is an integer, and the value of X is an odd integer. When the value of X is an odd number whose absolute value is 5 or less, a step amount of the first basic structure does not become too great, resulting in easy manufacture, thus, it is possible to control a loss of light amount caused by manufacturing errors and to decrease fluctuations of diffraction efficiency in the case of wavelength fluctuations, which is preferable.

Further, in at least a part of the first basic structure arranged around the optical axis in the central area, a step or steps face the opposite direction to the optical axis. The expression saying that "a step or steps face the opposite direction to the optical axis" means the situation shown in FIG. 4b. Further, "at least a part of the first basic structure arranged around the optical axis in the central area" means at least a step positioned closest to the optical axis among steps exhibiting the odd number of X. Preferably, steps exhibiting the odd number of X and existing in a space from the optical axis to a position of a half of a distance from the optical axis to a boundary between the central area and the intermediate area, face the direction opposite to the optical axis.

For example, apart of the first basic structure in the central area, located close to the intermediate area, may have steps facing the optical axis. Namely, as shown in FIG. 5b, the first basic structure may have a form that steps positioned around the optical axis face the opposite direction to the optical axis, then, the direction of the steps switches on the midway, and steps positioned around the intermediate area face the optical axis. It is preferable that all the steps of the first basic structure arranged in the central area face the opposite direction to the optical axis.

By providing steps of the first basic structure in which a diffraction order of the first light flux is an odd number and by arranging the steps to face the direction opposite to the optical axis, it is possible that sufficient working distance is secured when an objective lens works for a CD, even in a thick objective lens having a thick axial thickness used for achieving the compatibility of three types of optical disc of BDs, DVDs and CDs.

Even in a thick objective lens having a thick axial thickness used for achieving the compatibility of three types of optical disc of BDs, DVDs and CDs, it is preferable that the first basic structure has a paraxial power for the first light flux, from the viewpoint of securing a working distance sufficiently when the objective lens works for a CD. When an optical path difference function of the first basic structure is expressed by the expression (24) described later, the expression saying that "having a paraxial power" means that $B_2h^2$ is not 0.

The second basic structure is also a blaze-type structure. The second basic structure emits a Lth-order diffracted light flux with a larger light amount than diffracted light fluxes with any other diffraction order, when the first light flux passes through the second basic structure, emits a Mth-order diffracted light flux with a larger light amount than diffracted light fluxes with any other diffraction order, when the second light flux passes through the second basic structure, and emits a Nth-order diffracted light flux with a larger light amount than diffracted light fluxes with any other diffraction order, when the third light flux passes through the second basic structure. In this case, each of L, M and N is an integer, and the value of L is the even integer. When the value of L is an even number whose absolute value is 4 or less, a step amount of the second basic structure does not become too great, resulting in easy manufacture, thus, it is possible to control a loss of light amount caused by manufacturing errors can be controlled, and fluctuations of diffraction efficiency caused by wavelength fluctuations can be lowered, which is preferable.

Further, in at least a part of the second basic structure arranged around the optical axis in the central area, a step or steps face the optical axis. The expression saying that "a step or steps face the optical axis" means the situation shown in FIG. 4a. Further, "at least a part of the second basic structure arranged around the optical axis in the central area" means at least a step positioned closest to the optical axis among steps exhibiting the even number of L. Preferably, steps exhibiting the even number of L and existing in a space from the optical axis to a position of a half of a distance from the optical axis to a boundary between the central area and the intermediate area, face the direction opposite to the optical axis.

For example, apart of the second basic structure in the central area, located close to the intermediate area, may has steps facing the opposite direction to the optical axis. Namely, as shown in FIG. 5a, the second basic structure may have a form that steps positioned around the optical axis face the optical axis, then, the direction of the steps switches on the midway, and steps positioned around the intermediate area face the opposite direction to the optical axis. It is preferable that all the steps of the second basic structure arranged in the central area face the optical axis.

As stated above, by overlapping the first basic structure which generates a diffracted light with odd diffraction order for the first light flux and includes steps facing the opposite direction to the optical axis in at least a space around the optical axis in the central area, and the second basic structure which generates a diffracted light with even diffraction order for the first light flux and includes steps facing the optical axis in at least a space around the optical axis in the central area, together, the following effects can be obtained. By overlapping these steps together, the height of steps measured after the steps are overlapped together can be controlled not to be excessive high when compared with the situation that steps of the first basic structure and steps of the second basic structure are overlapped together to face the same direction. Accordingly, it enables to restrict loss of light amount caused due to manufacturing error and enables to restrict a fluctuation of a diffraction efficiency caused when a wavelength changes.

It is possible to provide an objective lens which enables compatibility of three types of optical discs of three types of BDs, DVDs and CDs, and further possible to provide an objective lens with well-balanced light utilizing efficiency so as to maintain high light utilizing efficiency for each of the three types of optical disc of BDs, DVDs, and CDs. For example, it is possible to provide an objective lens wherein a diffraction efficiency for wavelength λ1 is 80% or more, a diffraction efficiency for wavelength λ2 is 60% or more and a diffraction efficiency for wavelength λ3 is 50% or more, from the point of view of design. In addition, by providing a step or steps facing the opposite direction to the optical axis in the first basic structure, an aberration caused when a wavelength of an incident light changed to be longer, can be changed toward under-corrected (deficient correction) direction. Thereby, an aberration caused when a temperature of an optical pickup apparatus raises can be controlled to be small, which enables to provide an objective lens capable of maintaining a stable performance even under a temperature change, when plastic is employed for the material of the objective lens.

For maintaining stable properties even under the temperature change, when the objective lens is made of plastic, it is preferable that the third order spherical aberration and fifth order spherical aberration caused in the objective lens when a wavelength of the incident light flux becomes longer, are under-corrected (deficient correction).

The more preferable first optical path difference providing structure is formed by overlapping the first basic structure in which |X|, |Y| and |Z| are respectively 1,1 and 1 and the second basic structure in which |L|, |M| and |N| are respectively 2,1 and 1, together. Such the first optical path difference providing structure can have very low steps. Therefore, manufacturing errors can be reduced, and loss in light amount can further be controlled, thus, fluctuations of diffraction efficiency caused by wavelength fluctuations can be controlled to more excellent condition.

From the viewpoint of a form and a step amount of the first optical path difference providing structure in which the first basic structure and the second basic structure has been overlapped with each other, the first optical path difference providing structure wherein the first basic structure in which |X|, |Y| and |Z| are respectively 1,1 and 1, and the second basic structure in which |L|, |M| and |N| are respectively 2,1 and 1 are overlapped together, can be expressed as follows. It is preferable that at least a part of the first optical path difference providing structure arranged around the optical axis in the central area includes both of a step facing an opposite direction to the optical axis and a step facing the optical axis. The step facing an opposite direction to the optical axis and the step facing the optical axis preferably satisfy the following expressions (1) and (2), where d11 is an amount of the step facing the opposite direction to the optical axis, and d12 is an amount of the step facing the optical axis. More preferably, all steps in the central area satisfy the following expressions (1) and (2). When an objective lens equipped with an optical path difference providing structure is a convex single lens with an aspheric surface, an incident angle of a light flux entering the objective lens varies depending on a height from the optical axis, which results in a trend wherein a step amount grows greater in general at a position located further from the optical axis. The reason why the upper limit is multiplied by 1.5 in the following expression is because an increase of the step amount is taken into account. In the expression, n is a refractive index of the objective lens at the wavelength λ1.

$$0.6 \cdot (\lambda 1/(n-1)) < d11 < 1.5 \cdot (\lambda 1/(n-1)) \tag{1}$$

$$0.6 \cdot (\lambda 1/(n-1)) < d12 < 1.5 \cdot (2\lambda 1/(n-1)) \tag{2}$$

Incidentally, "at least a part of the first optical path difference providing structure arranged around the optical axis in the central area" means an optical path difference providing structure including both of at least a step located closest the optical axis and facing the direction opposite to the optical axis, and a step located closest to the optical axis and facing the direction of the optical axis. Preferably, it is an optical path difference providing structure including the steps existing in a space from the optical axis to a position of a half of a distance from the optical axis to a boundary between the central area and the intermediate area, face the (direction opposite to the optical axis.

For example, when λ1 is 390-415 nm (0.390 to 0.415 μm), and n is 1.54-1.60, the above expressions can be expressed as follows.

$$0.39 \, \mu m < d11 < 1.15 \, \mu m \tag{12}$$

$$0.39 \, \mu m < d12 < 2.31 \, \mu m \tag{13}$$

Further, with respect to the way to overlap the first basic structure and the second basic structure together, it is preferable that the pitch of the first basic structure and the pitch of the second basic structure are adjusted such that all the steps of the second basic structure are located at the same positions to steps of the first basic structure, or such that all the steps of the first basic structure are located at the same positions to steps of the second basic structure.

When positions of all the steps of the second basic structure are adjusted to positions of steps of the first basic structure as stated above, it is preferable that d11 and d12 of the first optical path difference providing structure satisfy respectively the following expressions (1') and (2').

It is more preferable that the following expressions (1') and (2') are satisfied in all over the central area.

$$0.6 \cdot (\lambda 1/(n-1)) < d11 < 1.5 \cdot (\lambda 1/(n-1)) \tag{1'}$$

$$0.6 \cdot (\lambda 1/(n-1)) < d12 < 1.5 \cdot (\lambda 1/(n-1)) \tag{2'}$$

Further, for example, when λ1 is 390-415 nm (0.390 to 0.415 μm) and n is 1.54-1.60, the expressions above can be expressed as follows.

$$0.39 \, \mu m < d11 < 1.15 \, \mu m \tag{12'}$$

$$0.39 \, \mu m < d12 < 1.15 \, \mu m \tag{13'}$$

It is more preferable that the following expressions are satisfied. It is further more preferable that the following expressions (1") and (2") are satisfied in all over the central area.

$$0.9 \cdot (\lambda 1/(n-1)) < d11 < 1.5 \cdot (\lambda 1/(n-1)) \tag{1"}$$

$$0.9 \cdot (\lambda 1/(n-1)) < d12 < 1.5 \cdot (\lambda 1/(n-1)) \tag{2"}$$

Further, for example, λ1 is 390-415 nm (0.390 to 0.415 μm) and n is 1.54-1.60, the expressions above can be expressed as follows.

$$0.59 \, \mu m < d11 < 1.15 \, \mu m \tag{12"}$$

$$0.59 \, \mu m < d12 < 1.15 \, \mu m \tag{13"}$$

By providing a first optical path difference providing structure formed by overlapping the first basic structure wherein |X|, |Y| and |Z| are respectively 1,1 and 1 and the second basic structure wherein |L|, |M| and |N| are respectively 2,1 and 1, together, the first basic structure can exhibit under-corrected (deficient correction) aberration when the wavelength of the incident light flux becomes longer, and the second basic structure can exhibit over-corrected (excessive correction). Such the structure do not exhibit wavelength characteristic which is excessively under-corrected or is excessively over-corrected, but exhibit wavelength characteristic which is under-corrected to a proper degree. As for the "wavelength characteristic which is under-corrected to a proper degree", it is preferable that an absolute value of λmms 150 or less. Due to this, it is possible to control aberration change caused by temperature change to be small even in the case when an objective lens is made of plastic, which is preferable from a point of view of the foregoing.

From the viewpoint of obtaining "wavelength characteristic which is under-corrected to a proper degree" as stated above, it is preferable that contribution of the first basic structure is dominant compared with the second basic structure. From a point of view to make contribution of the first basic structure to be dominant over the second basic structure, it is preferable that an average pitch of the first basic structure is smaller than that of the second basic structure. In other expressions, it is possible to express that a pitch of steps facing the direction opposite to the optical axis is smaller than a pitch of steps facing the optical axis, or it is possible to express that the number of steps facing the direction opposite to the optical axis is more than the number of steps facing the optical axis, in the first optical path difference providing structure. Incidentally, it is preferable that an average pitch of the first basic structure is one-fourth or less of an average pitch of the second basic structure. It is more preferable that an average pitch of the first basic structure is one-sixth or less of an average pitch of the second basic structure. By making an average pitch of the first basic structure to be one-fourth (or one-sixth, preferably) of an average pitch of the second basic structure, it is possible to make wavelength characteristics to be "under-corrected to a proper degree", and it is also preferable from a point of view to secure sufficient working distance in the case of a CD. In other expressions, it is possible to express that it is preferable that the number of steps facing the direction opposite to the optical axis is four times or more the number of steps feeing the optical axis, in the first optical path difference providing structure in the central area. Six times or more is more preferable.

Further, it is preferable that a minimum pitch of the first optical path (difference providing structure is 15 µm or less. From the viewpoint, the ratio p/fl, which is a ratio of the minimum pitch "p" of the first optical path difference providing structure to the focal length "fl" of the objective lens for the first wavelength λ1, is preferably 0.004 or less. The minimum pitch of 10 µm or less is more preferable. It is preferable that an average pitch of the first optical path difference providing structure is 30 µm or less. It is more preferable that the average pitch is 20 µm or less. By providing such the structure, it is possible to obtain wavelength characteristics to be under-corrected to a proper degree as stated above, and it is possible to keep a best focus position for necessary light used for recording and/or reproducing information for the third optical disc and a best focus position for unwanted light that is not used for recording and/or reproducing information for the third optical disc to be away from each other, and detection error can be reduced. Meanwhile, an average pitch is a value obtained by adding all pitches of the first optical path difference providing structure in the central area and by dividing it by the number of steps of the first optical path difference providing structure in the central area.

The objective lens of the present embodiment preferably exhibits a longitudinal chromatic aberration of 0.9 µm/nm or less, and more preferably exhibits that of 0.8 µm/nm or less. When the pitch of the first basic structure is excessively small, the longitudinal chromatic aberration deteriorates. Therefore, the objective lens is preferably designed in view of the pitch so as not to provide the longitudinal chromatic aberration of more than 0.9 µm/nm. From the viewpoint, the ratio p/fl, which is a ratio of the minimum pitch "p" of the first optical path difference providing structure to the focal length "fl" of the objective lens for the first wavelength λ1, is preferably 0.002 or more. On the other hand, the longitudinal chromatic aberration is preferably 0.4 µm/nm or more, in order to secure a sufficient working distance for CDs.

It is preferable that a first best focus position where light intensity of a spot formed by the third light flux is strongest and a second best focus position where light intensity of a spot formed by the third light flux is second strongest satisfy the following conditional expression (14) with the third light flux that has passed through the first optical path difference providing structure. Meanwhile, the best focus position mentioned in this case is one that indicates a position where a beam waist becomes a minimum in a certain defocusing range. The first best focus position is a best focus position for necessary light used for recording and/or reproducing for the third optical disc, and the second best focus position is a best focus position for a light flux having the largest amount of light amount among unwanted light fluxes which are not used for recording and/or reproducing for the third optical disc.

$$0.05 \leq L/fl3 \leq 035 \tag{14}$$

In the expression above, fl3 (mm) is a focal length of the third light flux that passes through the first optical path difference providing structure and forms a first best focus, and L (mm) indicates a focal length between the first best focus and the second best focus.

It is more preferable that the following conditional expression (14") is satisfied.

$$0.10 \leq L/fl3 \leq 025 \tag{14'}$$

Figure 6:
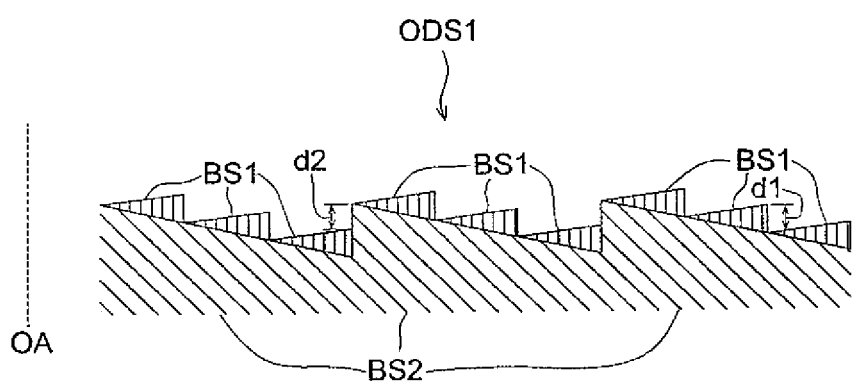
FIG. 6 is a schematic diagram of the first optical path difference providing structure.

A preferable example of the first optical path difference providing structure explained above is shown in FIG. 6. However FIG. 6 shows a structure that the first optical path difference structure ODS1 is provided on a flat plate for convenience, the first optical path difference structure may also be provided on a convex single lens with an aspheric surface. The first basic structure DS1 wherein |X|, |Y| and |Z| are respectively 1,1 and 1 is overlapped with the second basic structure BS2 wherein |L|, |M| and |N| are respectively 2,1 and 1. Steps of the second basic structure BS2 face the direction of optical axis OA, and steps of the first basic structure BS1 face the direction opposite to the optical axis. As can be seen from FIG. 6, the pitch of the first basic structure BS1 and the pitch of the second basic structure BS2 are adjusted such that all the steps of the second basic structure are located at the same positions to steps of the first basic structure. In the present example, d11=λ1/(n−1) holds and d12=λ1/(n−1) holds. In the present example, when λ1=405 nm (0.405 µm) and n=1.5592 hold, d11=d12=0.72 µm holds. In the present example, an average pitch of the first basic structure is smaller than that of the second basic structure, and the number of steps facing the direction opposite to the optical axis of the first basic structure is more than that of steps facing the optical axis of the second basic structure.

Next, the second optical path difference providing structure provided in the intermediate area will be explained. It is preferable that the second optical path difference providing structure is a structure in which at least two basic structures including the third basic structure and the fourth basic structures are overlapped together.

The third basic structure emits an Ath-order diffracted light flux with a larger light amount than diffracted light fluxes with any other diffraction order, when the first light flux passes through the third basic structure, emits a Bth-order diffracted light flux with a larger light amount than diffracted light fluxes with any other diffraction order, when the second light flux passes through the third basic structure, and emits a Cth-order diffracted light flux with a larger light amount than diffracted light fluxes with any other diffraction order, when the third light flux passes through the third basic structure. The fourth basic structure emits a Dth-order diffracted light flux with a larger light amount than diffracted light fluxes with any other diffraction order, when the first light flux passes through the fourth basic structure, emits a Eth-order diffracted light flux with a larger light amount than diffracted light fluxes with any other diffraction order, when the second light flux passes through the fourth basic structure, and emits a Fth-order diffracted light flux with a larger light amount than diffracted light fluxes with any other diffraction order, when the third light flux passes through the fourth basic structure. In this case, each of A,B,C,D,E and F is an integer.

The first optical path difference providing structure and the second optical path difference providing structure preferably satisfy the following expressions (15), (16), (17) and (18). Owing to this, a phase difference generated in the optical path difference providing structures in the central area and a phase difference generated in the optical path difference providing structure in the intermediate area can be made to be almost equal, and a phase shift between the central area and the intermediate area can be reduced accordingly, which is preferable.

$$X=A \tag{15}$$

$$Y=B \tag{16}$$

$$L=D \tag{17}$$

$$M=E \tag{18}$$

It is more preferable that Z=C and N=F are also satisfied. In other words, it is preferable that the first basic structure is the same as the third basic structure in terms of a structure and the second basic structure is the same as the fourth basic structure in terms of a structure.

When the third basic structure and the fourth basic structure are the same as the first basic structure and the second basic structure, respectively, it is preferable that a fifth basic structure is preferably overlapped with the third and fourth basic structures, in the second optical path difference providing structure.

At that time, it is preferable that the fifth basic structure emits a 0th-order diffracted light flux with a larger light amount than diffracted light fluxes with any other diffraction order, when the first light flux passes through the fifth basic structure, emits a 0th-order diffracted light flux with a larger light amount than diffracted light fluxes with any other diffraction order, when the second light flux passes through the fifth basic structure, and emits a Gth-order diffracted light flux with a larger light amount than diffracted light fluxes with any other diffraction order, when the third light flux passes through the fifth basic structure. In this case, G is an integer excluding 0. By overlapping such the fifth basic structure with the other basic structure, it is possible to form flare light on an information recording surface of the third optical disc with respect to only the third light flux, without having an influence on the first light flux and the second light flux each passing the intermediate area and generating a phase shift at the boundary of the central area and the intermediate area. Thereby, an influence of the unwanted light on the converged spot can be reduced.

It is preferable that G is ±1. When G is ±1, it is preferable that the fifth basic structure is a two-revel staircase structure (which is also called a binary structure) as shown in FIG. 3d.

When the fifth basic structure is a two-level staircase structure, it is preferable that step amount LB1 measured along its optical axis is the step amount that provides an optical path difference equivalent to 5 times the first wavelength λ1 for the first light flux, or the step amount that provides an optical path difference equivalent to 3 times the first wavelength λ1 for the first light flux. When the two-level staircase structure provides an optical path difference equivalent to 5 times the first wavelength λ1 for the first light flux, an influence of an unwanted light caused when information is recorded and/or reproduced for CD can be reduced substantially, which is preferable. On the other hand, by forming the two-level staircase structure into a structure to provide an optical path difference equivalent to 3 times the first wavelength λ1 for the first light flux, it is possible to lower a height of the fifth basic structure, thus, it is easy to manufacture, and manufacturing loss can be reduced, which is preferable from a viewpoint to prevent a decline of a light utilizing efficiency. It is also preferable from the viewpoint of controlling fluctuations of diffraction efficiency under the wavelength change to be small.

Namely, it is preferable that the step amount LB1 of the fifth basic structure satisfies the following conditional expressions (19) and (20).

$$0.9 \cdot (5 \cdot \lambda 1(n-1)) < LB1 < 1.5 \cdot (5 \cdot \lambda 1(n-1)) \tag{19}$$

$$0.9 \cdot (3 \cdot \lambda 1(n-1)) < LB1 < 1.5 \cdot (3 \cdot \lambda 1(n-1)) \tag{20}$$

Further, when λ1 is 390-415 nm (0.390-0.415 μm) and n is 1.54-1.60, the expressions above can be expressed as follows.

$$2.92 \, \mu m < LB1 < 5.77 \, \mu m \tag{21}$$

$$1.75 \, \mu m < LB1 < 3.46 \, \mu m \tag{22}$$

Therefore, a preferable second optical path difference providing structure becomes a structure wherein a binary structure satisfying G=±1 is overlapped with a structure that is equivalent to the aforesaid preferable first optical path difference providing structure.

Figure 10:
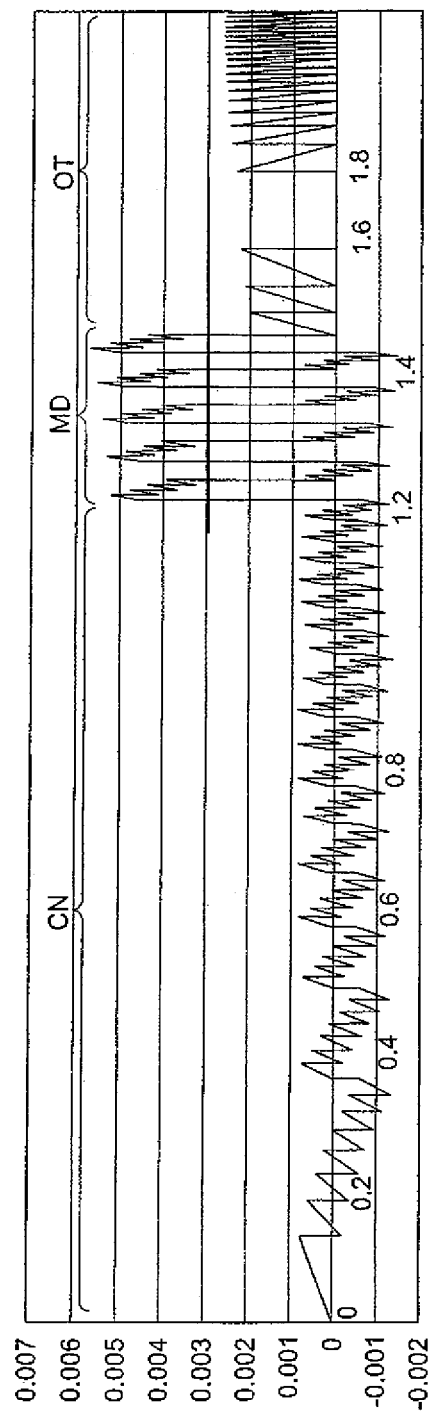
FIG. 10 is a sectional view schematically showing the first optical path difference providing structure, the second optical path difference providing structure, and the third optical path difference providing structure which are formed on a flat element.

Further, the second optical path difference providing structure preferably comprises steps on upper terrace surface Pc of a two-level staircase structure shown in intermediate area MD in FIG. 10. What is further preferable is that a plurality of steps are provided. It is preferable that these steps are derived from plural third basic structures and a single fourth basic structure.

By providing plural steps of the third basic structure on the upper terrace surface of the two-level staircase structure, it becomes easy for resins to run up to an end portion of a mold of the two-level staircase structure. Thereby, transfer characteristics are improved, a loss in manufacturing can be decreased and a decline of light utilization efficiency can be prevented. In addition, it becomes possible to locate a converging position of unwanted diffracted light to be farther from a converging position of necessary diffracted light. Thereby, a detection error caused by unwanted diffracted light converged on a light-receiving element, can be avoided which is preferable.

It is preferable that the smallest pitch of the fifth basic structure is 10 μm or more. The pitch is preferably 100 μm or less. By employing the two-level staircase structure whose step amount tends to be higher, in the intermediate area rather than the central area, it becomes possible to broaden a pitch, so that resin may easily reaches the deep portion of a mold in injection molding process, and thereby, to reduce a manufacturing loss.

Next when providing the third optical path difference providing structure in the peripheral area, an arbitral optical path a difference providing structure can be provided. The third optical path difference providing structure preferably comprises a sixth basic structure. The sixth basic structure emits an Pth-order diffracted light flux with a larger light amount than diffracted light fluxes with any other diffraction order, when the sixth light flux passes through the third basic structure, emits a Qth-order diffracted light flux with a larger light amount than diffracted light fluxes with any other diffraction order, when the second light flux passes through the sixth basic structure, and emits a Rth-order diffracted light flux with a larger light amount than diffracted light fluxes with any other diffraction order, when the third light flux passes through the sixth basic structure. In order to control a fluctuation of diffraction efficiency caused under wavelength change, the value of P is preferably 5 or less, and more preferably 2 or less.

A numerical aperture of the objective lens on tie image side that is needed tor reproducing and/or recording of information for the first optical disc is represented by NA1, a numerical aperture of the objective lens on the image side that is needed for reproducing and/or recording of information for the second optical disc is represented by NA2 (NA1>NA2) and a numerical aperture of the objective lens on the image side that is needed for reproducing and/or recording of information for the third optical disc is represented by NA3 (NA2>NA3). NA1 is preferably 0.75 or more and is 0.9 or less, and it is 0.8 or more and is 0.9 or less more preferably. It is especially preferable that NA1 is 0.85. NA2 is preferably 0.55 or more and is 0.7 or less. It is especially preferable that NA2 is 0.60 or 0.65. Further, NA3 is preferably 0.4 or more and is 0.55 or less. If is especially preferable that NA3 is 0.45 or 0.53.

It is preferable that a boundary between a central area and an intermediate area of the objective lens is formed on a portion that corresponds to a range from 0.9•NA3 or more to 12•NA3 or less (more preferably, 0.95•NA3 or more to 1.15•NA3 or less) in the case of using the third light flux. More preferably, a boundary between a central area and an intermediate area is formed on a portion corresponding to NA3. It is further preferable that a boundary between an intermediate area and a peripheral area is formed on a portion corresponding to a range from 0.9•NA2 or more to 1.2•NA2 or less (more preferably, 0.95•NA2 or more to 1.15•NA2 or less) in the case of using the second light flux. More preferably, a boundary between an intermediate area and a peripheral area of the objective lens is formed on a portion corresponding to NA2.

When the third light flux that has passed through the objective lens is converges on an information recording surface of the third optical disc, it is preferable that spherical aberration has at least one discontinuous portion. In that case, it is preferable that the discontinuous potion is in existent in a range from 0.9•NA3 or more to 12•NA3 or less (more preferably, 0.95•NA3 or more to 1.15•NA3 or less) in the case of using the third light flux.

The objective lens preferably satisfies the following conditional expression (3).

$$1.0 \leq d/f \leq 1.5 \quad (3)$$

In the expression above, d represents a thickness (mm) of the objective lens on the optical axis, and f represents a focal length of the objective lens in the first light flux.

When coping with an optical disc used with a short wavelength and high NA like a BD, there are caused problems that astigmatism tends to be caused and decentration coma tends to be caused. However, when the expression (3) is satisfied, it is possible to control occurrence of astigmatism and decentration coma.

Further, when the expression (3) is satisfied an objective lens becomes a thick objective lens whose thickness on the axis is great, thus, working distance in recording and/or reproducing for CDs tends to be short. However, the present embodiment employs the first optical path difference providing structure to secure a sufficient working distance in recording and/or reproducing for CD can be secured sufficiently. Therefore, its effect becomes remarkable.

Each of the first light flux, the second light flux and the third light flux may enter into the objective lens as a parallel light flux, or may enter into the objective lens as a divergent light flux or a convergent light flux. It is preferable that all of the first light flux, the second light flux and the third light flux enter into the objective lens as parallel light fluxes in order to prevent generation of coma even in the tracking operation. By employing the first optical path difference providing structure of the present embodiment, all of the first light flux, the second light flux and the third light flux can enter into the objective lens as parallel light fluxes or almost parallel light fluxes. Thereby, its effect becomes remarkable. When the first light flux is a parallel light flux or an almost parallel light flux, it is preferable that the magnification m1 of the objective lens when the first light flux enters into the objective lens satisfies the following expression (4).

$$-0.01 < m1 < 0.01 \quad (4)$$

When the second light flux enters the objective lens as a parallel light flux or an almost parallel light flux, it is preferable that the magnification m2 of the objective lens when the second light flux enters into the objective lens satisfies the following expression (5).

$$-0.01 < m2 < 0.01 \quad (5)$$

When the second light flux enters the objective lens as a divergent light flux, if is preferable that the magnification m1 of the objective lens when the second light flux enters into the objective lens satisfies the following expression (5).

$$-0.025 < m2 < -0.01 \quad (5')$$

When the third light flux enters the objective lens as a parallel light flux or an almost parallel light flux, it is preferable that the magnification m3 of the objective lens when the third light flux enters into the objective lens satisfies the following expression (6).

$$-0.01 < m3 < 0.01 \quad (6)$$

On the one hand, when third light flux enters the objective lens as a divergent light flux, it is preferable that the magnification m3 of the objective lens when the third light flux enters into the objective lens satisfies the following expression (6').

$$-0.025 < m3 \leq -0.01 \quad (6')$$

Further, it is preferable that the working distance (WD) of the objective lens when the third optical disc is used is 0.15 mm or more, and is 1.5 mm or less. The working distance of the objective lens when the third optical disc is preferably 0.3 mm or more, and 0.9 mm or less. Next, it is preferable that the working distance (WD) of the objective lens when the second optical disc is used, is 0.2 mm or more, and is 1.3 mm or less. The working distance is preferably that the working distance (WD) of the objective lens when the first optical disc is used is 0.25 mm or more, and is 1.0 mm or less.

An optical information recording and reproducing apparatus comprises an optical disc drive apparatus including the above optical pickup apparatus.

Herein, the optical disc drive apparatus installed in the optical information recording and reproducing apparatus will be described. There is provided the optical disc drive apparatus employing a system such that there is a tray which can hold an optical disc with the optical disc placed thereon and only the tray is taken out from the main body of the optical information recording and reproducing apparatus which houses an optical pickup apparatus therein; and a system such that the main body of the optical disc drive apparatus which houses an optical pickup apparatus therein is taken out.

The optical information recording and reproducing apparatus using each of the above described systems, is generally provided with the following component members: an optical pickup apparatus housed in a housing; a drive source of the optical pickup apparatus such as a seek-motor by which the optical pickup apparatus is moved together with the housing toward the inner periphery or outer periphery of the optical disc; traveling means for the optical pickup apparatus, including a guide rail for guiding the housing of the optical pickup apparatus toward the inner periphery or outer periphery of the optical disc; and a spindle motor for rotation drive of the optical disc. However, the component members of the optical information recording and reproducing apparatus are not limited to those.

The optical information recording and reproducing apparatus employing the former system is preferably provided with, other than those component members, a tray which can hold an optical disc under the condition that the optical disc is placed thereon, and a loading mechanism for slidably moving the tray. It is preferable that the optical information recording and reproducing apparatus employing the latter system does not include the tray and loading mechanism, and respective component members are provided in a drawer corresponding to chassis which can be taken out outside.

According to the above embodiments, even in a thick objective lens which is used for achieving compatibility of three types of optical disc of BDs, DVDs, and CDs and is thick along the optical axis, a sufficient working distance can be secured when the objective lens works for a CD. Further, the height of steps of the optical path difference providing structure can be controlled not to be excessive high, which enables to restrict loss of light amount cased due to manufacturing error, and enables to restrict a fluctuation of a diffraction efficiency caused when a wavelength changes. Further, the above embodiments can provide an objective lens with well-balanced light utilizing efficiencies so as to maintain high light utilizing efficiency for each of the three types of optical disc of BDs, DVDs, and CDs. The embodiments are advantageous in the way of downsizing. Further, an aberration caused when a temperature of an optical pickup apparatus raises can be controlled to be small, which enables to provide an objective lens which can maintain a stable performance even under a temperature change. These effects enable to record and/or reproduce information compatibly for the three types of optical discs of BDs, DVDs, and CDs with a common objective lens.

Figure 7:
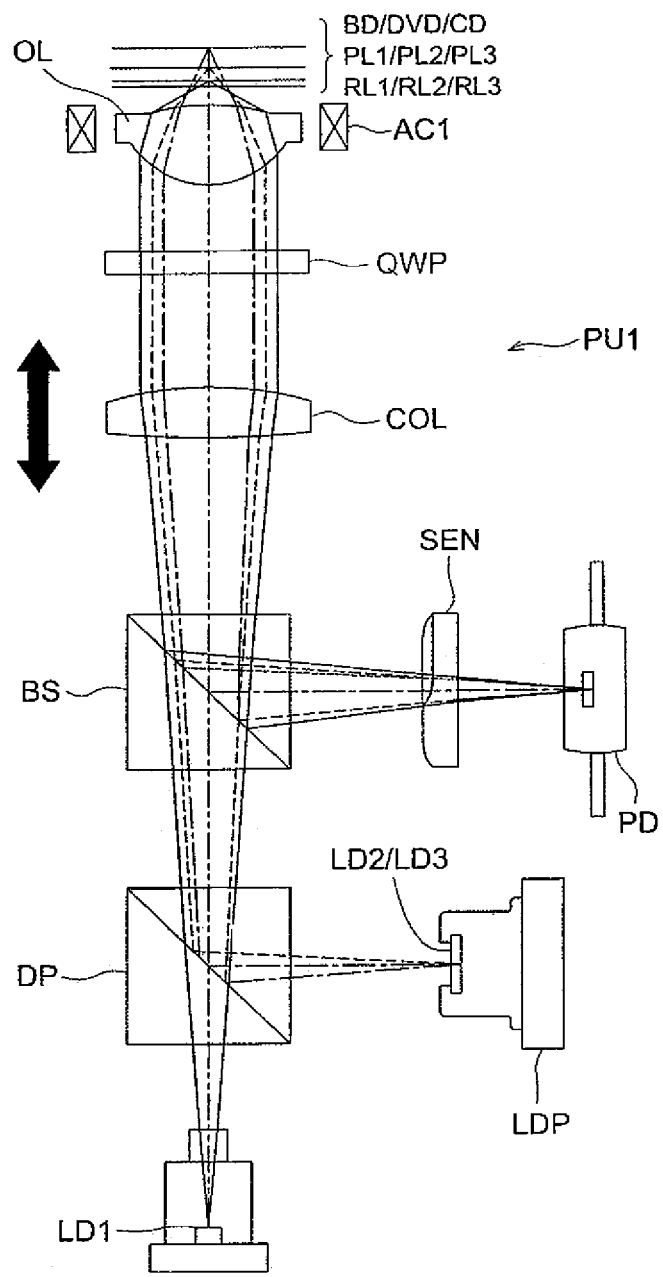
FIG. 7 is a diagram showing an outline of optical pickup apparatus PU1 of the present embodiment which can record and/or reproduce information properly for BDs, DVDs and CDs provided as different types of optical disc.

Preferred embodiments of the present invention will be described below, with referring the drawings. FIG. 7 is a diagram schematically showing optical pickup apparatus PU1 of the present embodiment capable of recording and/or reproducing information adequately for BDs, DVDs and CDs which are different optical discs. The optical pickup apparatus PU1 can be mounted in the optical information recording and reproducing apparatus. Herein, the first optical disc is a BD, the second optical disc is a DVD, and the third optical disc is a CD. Hereupon, the present invention is not limited to the present embodiment.

Optical pickup apparatus PU1 comprises objective lens OL, quarter wavelength plate QWP, collimation lens COL, polarization beam splitter BS, dichroic prism DP, first semiconductor laser LD1 (first light source), laser unit LDP, sensor lens SEN, and light-receiving element PD as a light-receiving element. The first semiconductor laser LD1 (first light source) emits a laser light flux with a wavelength of 405 nm (the first light flux) when information is recorded/reproduced for BDs. The laser unit LDP includes second semiconductor laser LD2 (second light source) emitting a laser light flux with a wavelength of 660 nm (second light flux) when information is recorded/reproduced for DVDs, and third semiconductor laser LD3 (third light source) emitting a laser light flux with a wavelength of 785 nm (third light flux) when in formation is recorded/reproduced for CDs, which are unitized in one body.

As shown in FIG. 1, objective lens OL which relates to the present embodiment is provided as a single lens includes an aspheric optical surface at the light source side on which central area CN including the optical axis, intermediate area MD arranged around the central area; and peripheral area OT arranged around the peripheral area are formed into concentric rings around the optical axis. The above-described first optical path difference providing structure is formed in central area CN, and the above-described second optical path difference providing structure is formed in intermediate area MD. In peripheral area OT, the third optical path difference providing structure is formed. In the present embodiment the third optical path difference providing structure is a blaze-type diffractive structure. The objective lens of the present embodiment is a plastic lens. The first optical path difference providing structure formed in central area CD is a structure in which the first basic structure and the second basic structure are overlapped together as shown in FIG. 6. The first basic structure emits a -1st order diffracted light flux with a larger light amount than diffracted light fluxes with any other diffraction order, when the first light flux passes through the first basic structure, emits a -1st order diffracted light flux with a larger light amount than diffracted light fluxes with any other diffraction order, when the second light flux passes through the first basic structure, and emits -1st order diffracted light flux with a larger light amount than diffracted light fluxes with any other diffraction order, when the third light flux passes through the first basic structure. At least a part of the first basic structure arranged around an optical axis in the central area CN includes a step or steps facing an opposite direction to the optical axis (namely, having a negative power). The second basic structure emits a second-order diffracted light flux with a larger light amount than diffracted light fluxes with any other diffraction order, when the first light flux passes through the second basic structure, which emits a first-order diffracted light flux with a larger light amount than diffracted light fluxes with any other diffraction order, when the second light flux passes through the second basic structure, and which emits a first-order diffracted light flux with a larger light amount than diffracted light fluxes with any other diffraction order, when the third light flux passes through the second basic structure. At least a part of the second basic structure arranged around the optical axis in the central area CN includes a step or steps facing the optical axis (Namely, having a positive power). The objective lens exhibits a longitudinal chromatic aberration of 0.9 μm/nm or less.

Blue-violet semiconductor laser LD1 emits a first light flux (λ1=405 nm) which is a divergent light flux. As illustrated by solid lines, the divergent light flux passes through dichroic prism DP and polarization beam splitter BS, and is converted into a collimated light flux by collimation lens COL. Quarter wavelength plate QWP converts the polarization of the collimated light from linear polarization to circular polarization.

Then, the diameter of the resulting light flux is regulated by a stop and the light flux enters objective lens OL. A light flux converged by the central area, intermediate area, and peripheral area of objective lens OL, forms a spot on information recording surface RL1 of a BD through protective substrate PL1 with thickness of 0.1 mm.

The light flux on information recording surface RL1 is reflected and modulated by the information pit on the information recording surface RL1. The reflected light flux passes through objective lens OL and the stop again, and quarter wavelength plate QWP converts the polarization of the light flux from circular polarization to linear polarization. Then, collimation lens COL converts the light flux into a convergent light flux. The convergent light flux is reflected by polarization beam splitter BS and is converged on a light-receiving surface of light receiving element PD through sensor lens SEN. Then, information recorded in a BD can be read based on the output signal of light-receiving element PD, by performing focusing and tracking operations for objective lens OL using biaxial actuator AC1. When the wavelength changes in the first light flux or when information is recorded and/or reproduced for BD including plural information recording layers, collimation lens COL as a magnification changing means is displaced in the direction of the optical axis to change a divergent angle or convergent angle of a light flux entering objective lens OL. Thereby, spherical aberration caused because of the wavelength change or the difference of the information recording layers can be corrected.

Semiconductor laser LD2 in laser unit LDP emits a second light flux ($\lambda 2$=658 nm) which is a divergent light flux. As illustrated by dotted lines, the emitted divergent light flux is reflected by dichroic prism DP and passes polarization beam splitter BS and animation lens COL. Then, quarter wavelength plate QWP converts the polarization of the light flux from linear polarization to circular polarization, and the resulting light flux enters objective lens OL. Herein, a light flux converged by the central area and the intermediate area of objective lens OL becomes a spot formed on information recording surface PL2 of a DVD through protective substrate PL2 with thickness of 0.6 mm, to form a central spot portion, where a light flux passing through the intermediate area and the peripheral area is formed into flare light to form a peripheral spot portion.

The light flux on information recording surface RL2 is reflected and modulated by the information pit on the information recording surface RL2. The reflection light flux passes through objective lens OL again, and quarter wavelength plate QWP converts the polarization of the light flux from circular polarization to linear polarization The resulting tight flux is formed into a convergent light flux by animation lens COL, and reflected by polarization beam splitter BS. Then, the light flux is converged on a light-receiving surface of light-receiving element PD through sensor lens SEN. Then, the information recorded in a DVD can be read by using the output signal of tight-receiving element PD.

Semiconductor laser LD3 in laser unit LDP emits a third light flux ($\lambda 3$=785 nm) which is a divergent light flux. As illustrated by long dashed short dashed line, the divergent light flux is reflected by dichroic prism DP, and passes polarization beam splitter BS and collimation lens COL. Then, quarter wavelength plate QWP converts the polarization of the light flux from linear polarization to circular polarization and the resulting light flux enters objective lens OL. Herein, the incident light flux is converged by the central area of objective lens OL forms a spot on information recording surface PL3 of CD through protective substrate PL2 with thickness of 12 mm, where a light flux passing through the intermediate area and the peripheral area is formed into a flare light to form a peripheral spot portion.

The light flux on information recording surface RL3 is reflected and modulated by the information pit on the information recording surface RL3. The reflection light flux passes through objective lens OL again, and quarter wavelength plate QWP converts the polarization of the light flux from linear polarization. The resulting light is formed into a convergent light flux by collimation lens COL and reflected by polarization beam splitter BS. Then, the light flux is converged on a light-receiving surface of the lint-receiving element PD through sensor lens SN. Then, information recorded in a CD can be read by using output signal of the third light-receiving element PD.

EXAMPLES

Next, an example which can be used for tire above described embodiment will be described. Hereinafter including lens data in a table), the power of 10 will be expressed as by using "E" (For example, 2.5×10" will be expressed as 2.5E-3). Each optical surface of the objective lens is formed as an aspheric surface, which has a symmetric shape around the optical axis defined by a mathematical expression obtained by assigning corresponding values of coefficients to the following expression (23).

$$X(h) = \frac{(h^2/r)}{1 + \sqrt{1-(1+\kappa)(h/r)^2}} + \sum_{i=0}^{10} A_{2i}h^{2i} \quad (23)$$

Herein, X(h) is an axis along the optical axis (the direction of traveling light is defined as a positive direction), $\kappa$ is a conic constant, $A_{2i}$ is an aspheric coefficient, h is a height from the optical axis, and r is a paraxial curvature radius.

In a example employing a diffractive structure, an optical path difference provided by the diffractive structure to each of the light fluxes with respective wavelengths is defined by a mathematical expression obtained by assigning corresponding coefficients to the following optical path difference function.

$$\Phi = m\lambda \sum B_{2i}h^{2i} \quad (24)$$

(Unit: mm)

In the expression, h is a height from the optical axis, $\lambda$ is a wavelength of an incident light flux, m is a diffraction order, and $B_{2i}$ is a coefficient of the optical path difference function.

Example 1

An objective lens of Example 1 is a plastic single lens. A schematic diagram of the first optical path difference providing structure in Example 1 is shown in FIG. 6, where the diagram in FIG. 6 is just a schematic diagram and it is different from the actual form of Example 1. The first optical path difference providing structure of Example 1 is an optical path difference providing structure wherein first basic structure BS1 representing a blaze-type diffractive structure in which |X|, |Y| and |Z| are respectively 1,1 and 1 is overlapped with second basic structure BS2 representing a blaze-type diffractive structure in which |L|, |M| and |N| are respectively 2,1 and 1. Steps in the second basic structure BS2 face the direction of the optical axis OA, and steps in the first basic structure BS1 face the direction opposite to the optical axis OA. In addition, a pitch of first basic structure BS1 is adjusted to the second basic structure BS2, so that positions of all the steps in the second basic structure agree with positions of steps of the first basic structure. Further, an average pitch of first basic structure BS1 is smaller than an average pitch of the second basic structure BS2, and the number of steps facing the direction opposite to the optical axis of the first basic structure is more than that of steps facing the direction of the optical axis in the second basic structure.

The first optical path difference providing structure in Example 1 satisfies the following expressions (1") and (2"). The symbol d11 represents an amount of steps facing the direction opposite to the optical axis, and d12 represents an amount of steps facing the direction of the optical axis.

$$0.9 \cdot (\lambda 1/(n-1)) < d11 < 1.5 \cdot (\lambda 1/(n-1)) \quad (1")$$

$$0.9 \cdot (\lambda 1/(n-1)) < d12 < 1.5 \cdot (\lambda 1/(n-1)) \quad (2")$$

Since λ1 is 405 nm (0.405 μm) and n is 1.5592 in Example 1, step amount d11 and step amount d12 satisfy the following expressions.

$$0.65 \, \mu m < d11 < 1.09 \, \mu m$$

$$0.65 \, \mu m < d12 < 1.09 \, \mu m$$

The second optical path difference providing structure in Example 1 is an optical path difference providing structure wherein the fifth basic structure is overlapped with a structure in which the third basic structure equal to the first basic structure and the fourth basic structure equal to the second basic structure are overlapped together. The fifth basic structure in Example 1 is a two-level staircase diffractive structure (binary structure) which emits a 0th-order diffracted light flux with a larger light amount than diffracted light fluxes with any other diffraction order, when the first light flux passes through the fifth basic structure, emits a 0th-order diffracted light flux with a larger light amount than diffracted light fluxes with any other diffraction order, when the second light flux passes through the fifth basic structure, and emits ±first order diffracted light flux with a larger light amount than diffracted light fluxes with any other diffraction order, when the third light flux passes through the fifth basic structure.

Table 1 shows lens data of Example 1.

TABLE 1

| Focal length of objective lens | $f_1$ = 2.20 mm | $f_2$ = 2.38 mm | $f_3$ = 2.45 mm |
|---|---|---|---|
| Numerical Aperture | NA1: 0.85 | NA2: 0.60 | NA3: 0.47 |
| Magnification | m1: 0 | m2: 0 | m3: 0 |

| i-th surface | ni | di (405 nm) | ni (405 nm) | di (660 nm) | ni (660 nm) | di (785 nm) | ni (785 nm) |
|---|---|---|---|---|---|---|---|
| 0 | | ∞ | | ∞ | | ∞ | |
| 1 (Stop diameter) | | 0.0 (φ3.74 mm) | | 0.0 (φ2.87 mm) | | 0.0 (φ2.30 mm) | |
| 2-1 | 1.3099 | 2.670 | 1.5414 | 2.670 | 1.5225 | 2.670 | 1.5193 |
| 2-2 | 1.5097 | | | | | | |
| 2-3 | 1.4723 | | | | | | |
| 3 | −2.3669 | 0.721 | | 0.646 | | 0.359 | |
| 4 | ∞ | 0.0875 | 1.6196 | 0.600 | 1.5773 | 1.200 | 1.5709 |
| 5 | ∞ | | | | | | |

| | | Surface no. | | | |
|---|---|---|---|---|---|
| | | 2-1 | 2-2 | 2-3 | 3 |
| | Area | h ≤ 1.180 | 1.180 ≤ h ≤ 1.45 | 1.45 ≤ h ≤ 1.87 | |
| Aspheric surface coefficient | κ | −8.7226E−01 | −3.7413E−01 | −5.9930E−01 | −3.3091E+01 |
| | A0 | 0.0000E+00 | 2.4521E−02 | 2.2268E−02 | 0.0000E+00 |
| | A4 | 7.9383E−03 | 2.3786E−02 | 1.9406E−02 | 1.0060E−01 |
| | A6 | 5.4165E−03 | −1.8940E−03 | −1.0124E−04 | −9.9722E−02 |
| | A8 | 3.1408E−04 | −3.0942E−04 | 2.4046E−03 | 7.7657E−02 |
| | A10 | −1.3516E−03 | −2.2047E−03 | −1.5974E−03 | −4.3120E−02 |
| | A12 | 5.1208E−04 | 5.9886E−04 | 2.3273E−04 | 1.4491E−02 |
| | A14 | 7.0800E−04 | 3.2379E−04 | 2.3920E−04 | −2.5798E−03 |
| | A16 | −7.9609E−04 | −2.2751E−04 | −1.6547E−04 | 1.8060E−04 |
| | A18 | 3.2163E−04 | 8.4526E−05 | 4.5018E−05 | 0.0000E+00 |
| | A20 | −4.3814E−05 | −1.5640E−05 | −4.6358E−06 | 0.0000E+00 |
| First optical path difference function | Diffraction order | 1/1/1 | 1/1/1 | 2/1/1 | |
| | B2 | 6.3821E+01 | 6.4208E+01 | 1.4185E+01 | |
| | B4 | −6.0360E+00 | −6.3479E+00 | 1.7360E+00 | |
| | B6 | 3.1232E+00 | 2.4210E+00 | −1.7979E−01 | |
| | B8 | −1.3062E+00 | −5.1565E−01 | −1.0132E−01 | |
| | B10 | 2.5156E−01 | 5.8699E−02 | −4.6009E−02 | |
| Second optical path difference function | Diffraction order | 2/1/1 | 2/1/1 | — | |
| | B2 | −7.6263E+00 | −7.6722E+00 | — | |
| | B4 | −3.7264E+00 | −4.1548E+00 | — | |
| | B6 | 1.5761E+00 | 1.4111E+00 | — | |
| | B8 | −9.7167E−01 | −3.8603E−01 | — | |
| | B10 | 2.3713E−01 | 7.2573E−02 | — | |

TABLE 1-continued

| Third optical path difference function | Diffraction order | — | 0/0/±1 | — |
|---|---|---|---|---|
| | B2 | — | −9.4827E+01 | — |
| | B4 | — | 1.9720E+02 | — |
| | B6 | — | −1.5525E+02 | — |
| | B8 | — | 5.5362E+01 | — |
| | B10 | — | −7.4420E+00 | — |

Wavelength Characteristic +5 nm
ΔSA3: −0.105
ΔSA5: −0.024
SAH: 0.015
$|d(n-1)/\lambda_1 * N|$:

Further, Tables 2 to 6 show data of an actual form of the objective lens which is designed based on lens data of Example 1. The data of actual form of each ring-shaped zone is obtained by substituting data shown in Tables 2 to 6 in the numerical expression (25). In Tables 2 to 6, hs represents a height at which each ring-shaped zone starts, and hl represents a height at which each ring shaped zone ends.

$$x = A_0 + A_2 \times h^2 + A_4 \times h^4 + A_6 \times h^6 \quad (25)$$

The symbol h represents a height from the optical axis in the direction perpendicular to the optical axis. Further, FIG. 10 is a sectional view schematically showing the first optical path difference providing structure, the second optical path difference providing structure, and the third optical path difference providing structure of Example 1 which are formed on a flat plate. The symbol CN represents a central area on which the first optical path difference providing structure is formed, the symbol MD represents a intermediate area on which the second optical path difference providing structure is formed, and the symbol OT represents a peripheral area on which the third optical path difference providing structure is formed.

TABLE 2

| | Ring No. | hs (mm) | hl (mm) | A0 | A2 | A4 | A6 | Pitch (mm) |
|---|---|---|---|---|---|---|---|---|
| Central Area | 1 | 0.00000 | 0.12527 | 0.00000 | 0.33265 | 0.02116 | 0.00000 | 0.12527 |
| | 2 | 0.12527 | 0.17728 | 0.00094 | 0.33275 | 0.02123 | 0.00000 | 0.05202 |
| | 3 | 0.17728 | 0.21728 | 0.00188 | 0.33284 | 0.02131 | 0.00000 | 0.04000 |
| | 4 | 0.21728 | 0.25108 | 0.00283 | 0.33293 | 0.02139 | 0.00000 | 0.03379 |
| | 5 | 0.25108 | 0.28091 | 0.00377 | 0.33302 | 0.02148 | 0.00000 | 0.02983 |
| | 6 | 0.28091 | 0.30793 | 0.00471 | 0.33310 | 0.02158 | 0.00000 | 0.02703 |
| | 7 | 0.30793 | 0.33283 | 0.00566 | 0.33318 | 0.02168 | 0.00000 | 0.02490 |
| | 8 | 0.33283 | 0.35606 | 0.00660 | 0.33325 | 0.02179 | 0.00000 | 0.02322 |
| | 9 | 0.35606 | 0.37791 | 0.00609 | 0.33317 | 0.02188 | 0.00000 | 0.02185 |
| | 10 | 0.37791 | 0.39861 | 0.00703 | 0.33324 | 0.02200 | 0.00000 | 0.02071 |
| | 11 | 0.39861 | 0.41834 | 0.00798 | 0.33330 | 0.02212 | 0.00000 | 0.01973 |
| | 12 | 0.41834 | 0.43723 | 0.00892 | 0.33336 | 0.02224 | 0.00000 | 0.01888 |
| | 13 | 0.43723 | 0.45537 | 0.00987 | 0.33341 | 0.02237 | 0.00000 | 0.01814 |
| | 14 | 0.45537 | 0.47286 | 0.01082 | 0.33345 | 0.02250 | 0.00000 | 0.01749 |
| | 15 | 0.47286 | 0.48976 | 0.01177 | 0.33349 | 0.02264 | 0.00000 | 0.01690 |
| | 16 | 0.48976 | 0.50613 | 0.01126 | 0.33338 | 0.02276 | 0.00000 | 0.01637 |
| | 17 | 0.50613 | 0.52203 | 0.01221 | 0.33341 | 0.02290 | 0.00000 | 0.01589 |
| | 18 | 0.52203 | 0.53748 | 0.01316 | 0.33343 | 0.02304 | 0.00000 | 0.01546 |
| | 19 | 0.53748 | 0.55254 | 0.01412 | 0.33345 | 0.02319 | 0.00000 | 0.01506 |
| | 20 | 0.55254 | 0.56722 | 0.01507 | 0.33346 | 0.02334 | 0.00000 | 0.01469 |
| | 21 | 0.56722 | 0.58157 | 0.01603 | 0.33346 | 0.02350 | 0.00000 | 0.01434 |
| | 22 | 0.58157 | 0.59559 | 0.01459 | 0.34150 | 0.00000 | 0.02274 | 0.01403 |
| | 23 | 0.59559 | 0.60932 | 0.01545 | 0.34194 | 0.00000 | 0.02185 | 0.01373 |
| | 24 | 0.60932 | 0.62278 | 0.01631 | 0.34238 | 0.00000 | 0.02104 | 0.01345 |
| | 25 | 0.62278 | 0.63597 | 0.01716 | 0.34282 | 0.00000 | 0.02030 | 0.01319 |
| | 26 | 0.63597 | 0.64892 | 0.01801 | 0.34326 | 0.00000 | 0.01962 | 0.01295 |
| | 27 | 0.64892 | 0.66164 | 0.01886 | 0.34370 | 0.00000 | 0.01899 | 0.01272 |
| | 28 | 0.66164 | 0.67414 | 0.01825 | 0.34399 | 0.00000 | 0.01839 | 0.01250 |
| | 29 | 0.67414 | 0.68643 | 0.01908 | 0.34443 | 0.00000 | 0.01785 | 0.01229 |
| | 30 | 0.68643 | 0.69853 | 0.01992 | 0.34487 | 0.00000 | 0.01735 | 0.01210 |

TABLE 3

| | Ring No. | hs (mm) | hl (mm) | A0 | A2 | A4 | A6 | Pitch (mm) |
|---|---|---|---|---|---|---|---|---|
| Central Area | 31 | 0.69853 | 0.71045 | 0.02075 | 0.34531 | 0.00000 | 0.01689 | 0.01191 |
| | 32 | 0.71045 | 0.72218 | 0.02380 | 0.33275 | 0.02533 | 0.00000 | 0.01174 |
| | 33 | 0.72218 | 0.73375 | 0.02479 | 0.33266 | 0.02552 | 0.00000 | 0.01157 |
| | 34 | 0.73375 | 0.74516 | 0.02433 | 0.33243 | 0.02568 | 0.00000 | 0.01141 |
| | 35 | 0.74516 | 0.75641 | 0.02532 | 0.33233 | 0.02588 | 0.00000 | 0.01125 |
| | 36 | 0.75641 | 0.76751 | 0.09062 | 0.00000 | 0.59827 | −0.32850 | 0.01111 |
| | 37 | 0.76751 | 0.77848 | 0.09347 | 0.00000 | 0.58204 | −0.31002 | 0.01096 |

TABLE 3-continued

| | Ring No. | hs (mm) | hl (mm) | A0 | A2 | A4 | A6 | Pitch (mm) |
|---|---|---|---|---|---|---|---|---|
| | 38 | 0.77848 | 0.78931 | 0.09633 | 0.00000 | 0.56669 | −0.29303 | 0.01083 |
| | 39 | 0.78931 | 0.80000 | 0.09771 | 0.00000 | 0.55189 | −0.27724 | 0.01070 |
| | 40 | 0.80000 | 0.81058 | 0.10058 | 0.00000 | 0.53808 | −0.26276 | 0.01057 |
| | 41 | 0.81058 | 0.82103 | 0.10346 | 0.00000 | 0.52496 | −0.24936 | 0.01045 |
| | 42 | 0.82103 | 0.83136 | 0.02674 | 0.34981 | 0.00000 | 0.01332 | 0.01034 |
| | 43 | 0.83136 | 0.84158 | 0.02753 | 0.35025 | 0.00000 | 0.01310 | 0.01022 |
| | 44 | 0.84158 | 0.85170 | 0.02686 | 0.35052 | 0.00000 | 0.01287 | 0.01011 |
| | 45 | 0.85170 | 0.86171 | 0.02764 | 0.35096 | 0.00000 | 0.01267 | 0.01001 |
| | 46 | 0.86171 | 0.87162 | 0.02842 | 0.35139 | 0.00000 | 0.01248 | 0.00991 |
| | 47 | 0.87162 | 0.88143 | 0.02920 | 0.35182 | 0.00000 | 0.01231 | 0.00981 |
| | 48 | 0.88143 | 0.89114 | 0.02997 | 0.35225 | 0.00000 | 0.01213 | 0.00972 |
| | 49 | 0.89114 | 0.90077 | 0.02929 | 0.35251 | 0.00000 | 0.01196 | 0.00962 |
| | 50 | 0.90077 | 0.91030 | 0.03005 | 0.35294 | 0.00000 | 0.01180 | 0.00954 |
| | 51 | 0.91030 | 0.91975 | 0.03081 | 0.35336 | 0.00000 | 0.01166 | 0.00945 |
| | 52 | 0.91975 | 0.92911 | 0.03157 | 0.35379 | 0.00000 | 0.01152 | 0.00936 |
| | 53 | 0.92911 | 0.93840 | 0.03233 | 0.35421 | 0.00000 | 0.01138 | 0.00928 |
| | 54 | 0.93840 | 0.94760 | 0.03164 | 0.35447 | 0.00000 | 0.01124 | 0.00920 |
| | 55 | 0.94760 | 0.95673 | 0.03239 | 0.35488 | 0.00000 | 0.01112 | 0.00913 |
| | 56 | 0.95673 | 0.96578 | 0.03314 | 0.35530 | 0.00000 | 0.01101 | 0.00905 |
| | 57 | 0.96578 | 0.97476 | 0.03389 | 0.35571 | 0.00000 | 0.01090 | 0.00898 |
| | 58 | 0.97476 | 0.98367 | 0.03463 | 0.35612 | 0.00000 | 0.01080 | 0.00891 |
| | 59 | 0.98367 | 0.99251 | 0.03393 | 0.35636 | 0.00000 | 0.01068 | 0.00884 |
| | 60 | 0.99251 | 1.00128 | 0.03467 | 0.35677 | 0.00000 | 0.01059 | 0.00877 |

TABLE 4

| | Ring No. | hs (mm) | hl (nm) | A0 | A2 | A4 | A6 | Pitch (mm) |
|---|---|---|---|---|---|---|---|---|
| Central Area | 61 | 1.00128 | 1.00999 | 0.15581 | 0.00000 | 0.35317 | −0.10591 | 0.00871 |
| | 62 | 1.00999 | 1.01863 | 0.15878 | 0.00000 | 0.34754 | −0.10218 | 0.00864 |
| | 63 | 1.01863 | 1.02721 | 0.16024 | 0.00000 | 0.34194 | −0.09860 | 0.00858 |
| | 64 | 1.02721 | 1.03573 | 0.16321 | 0.00000 | 0.33665 | −0.09523 | 0.00852 |
| | 65 | 1.03573 | 1.04419 | 0.16619 | 0.00000 | 0.33153 | −0.09200 | 0.00846 |
| | 66 | 1.04419 | 1.05259 | 0.16917 | 0.00000 | 0.32656 | −0.08893 | 0.00840 |
| | 67 | 1.05259 | 1.06093 | 0.17065 | 0.00000 | 0.32160 | −0.08596 | 0.00834 |
| | 68 | 1.06093 | 1.06922 | 0.17365 | 0.00000 | 0.31692 | −0.08315 | 0.00829 |
| | 69 | 1.06922 | 1.07745 | 0.17665 | 0.00000 | 0.31236 | −0.08046 | 0.00823 |
| | 70 | 1.07745 | 1.08563 | 0.17966 | 0.00000 | 0.30794 | −0.07789 | 0.00818 |
| | 71 | 1.08563 | 1.09376 | 0.18116 | 0.00000 | 0.30350 | −0.07539 | 0.00813 |
| | 72 | 1.09376 | 1.10184 | 0.18418 | 0.00000 | 0.29930 | −0.07302 | 0.00808 |
| | 73 | 1.10184 | 1.10987 | 0.18721 | 0.00000 | 0.29522 | −0.07074 | 0.00803 |
| | 74 | 1.10987 | 1.11784 | 0.19025 | 0.00000 | 0.29123 | −0.06856 | 0.00797 |
| | 75 | 1.11784 | 1.12577 | 0.19178 | 0.00000 | 0.28723 | −0.06644 | 0.00793 |
| | 76 | 1.12577 | 1.13366 | 0.19484 | 0.00000 | 0.28343 | −0.06441 | 0.00789 |
| | 77 | 1.13366 | 1.14149 | 0.19791 | 0.00000 | 0.27972 | −0.06246 | 0.00783 |
| | 78 | 1.14149 | 1.14928 | 0.20099 | 0.00000 | 0.27610 | −0.06057 | 0.00779 |
| | 79 | 1.14928 | 1.15703 | 0.20256 | 0.00000 | 0.27244 | −0.05874 | 0.00775 |
| | 80 | 1.15703 | 1.16473 | 0.20566 | 0.00000 | 0.26897 | −0.05698 | 0.00770 |
| | 81 | 1.16473 | 1.17239 | 0.20878 | 0.00000 | 0.26556 | −0.05528 | 0.00766 |
| | 82 | 1.17239 | 1.18000 | 0.21192 | 0.00000 | 0.26223 | −0.05364 | 0.00761 |

TABLE 5

| | Ring No. | hs (mm) | hl (mm) | A0 | A2 | A4 | A6 | Pitch (mm) |
|---|---|---|---|---|---|---|---|---|
| Intermediate area | 83 | 1.18000 | 1.18752 | 0.21381 | 0.00000 | 0.258730 | −0.05205 | 0.00752 |
| | 84 | 1.18752 | 1.19500 | 0.21670 | 0.00000 | 0.255927 | −0.05070 | 0.00748 |
| | 85 | 1.19500 | 1.20244 | 0.21961 | 0.00000 | 0.253166 | −0.04938 | 0.00744 |
| | 86 | 1.20244 | 1.20983 | 0.22255 | 0.00000 | 0.250447 | −0.04810 | 0.00739 |
| | 87 | 1.20983 | 1.21718 | 0.22005 | 0.00000 | 0.247375 | −0.04682 | 0.00735 |
| | 88 | 1.21718 | 1.22449 | 0.22302 | 0.00000 | 0.244742 | −0.04561 | 0.00731 |
| | 89 | 1.22449 | 1.23176 | 0.22601 | 0.00000 | 0.242144 | −0.04443 | 0.00727 |
| | 90 | 1.23176 | 1.23899 | 0.22902 | 0.00000 | 0.239580 | −0.04328 | 0.00723 |
| | 91 | 1.23899 | 1.24617 | 0.23446 | 0.00000 | 0.237204 | −0.04216 | 0.00718 |
| | 92 | 1.24617 | 1.25332 | 0.23752 | 0.00000 | 0.234701 | −0.04106 | 0.00715 |
| | 93 | 1.25332 | 1.26043 | 0.24060 | 0.00000 | 0.232226 | −0.03999 | 0.00711 |
| | 94 | 1.26043 | 1.26749 | 0.24370 | 0.00000 | 0.229782 | −0.03894 | 0.00706 |
| | 95 | 1.26749 | 1.27452 | 0.24131 | 0.00000 | 0.227059 | −0.03791 | 0.00703 |
| | 96 | 1.27452 | 1.28152 | 0.24445 | 0.00000 | 0.224681 | −0.03691 | 0.00700 |
| | 97 | 1.28152 | 1.28847 | 0.24762 | 0.00000 | 0.222331 | −0.03594 | 0.00695 |

TABLE 5-continued

| Ring No. | hs (mm) | hl (mm) | A0 | A2 | A4 | A6 | Pitch (mm) |
|---|---|---|---|---|---|---|---|
| 98 | 1.28847 | 1.29539 | 0.25080 | 0.00000 | 0.220009 | −0.03498 | 0.00692 |
| 99 | 1.29539 | 1.30227 | 0.25645 | 0.00000 | 0.217833 | −0.03404 | 0.00688 |
| 100 | 1.30227 | 1.30912 | 0.25968 | 0.00000 | 0.215562 | −0.03312 | 0.00685 |
| 101 | 1.30912 | 1.31593 | 0.26293 | 0.00000 | 0.213319 | −0.03223 | 0.00681 |
| 102 | 1.31593 | 1.32271 | 0.26620 | 0.00000 | 0.211105 | −0.03135 | 0.00678 |
| 103 | 1.32271 | 1.32945 | 0.26389 | 0.00000 | 0.208690 | −0.03053 | 0.00674 |
| 104 | 1.32945 | 1.33616 | 0.26718 | 0.00000 | 0.206546 | −0.02970 | 0.00671 |
| 105 | 1.33616 | 1.34283 | 0.27048 | 0.00000 | 0.204435 | −0.02889 | 0.00667 |
| 106 | 1.34283 | 1.34947 | 0.27379 | 0.00000 | 0.202359 | −0.02810 | 0.00664 |
| 107 | 1.34947 | 1.35607 | 0.27958 | 0.00000 | 0.200410 | −0.02732 | 0.00660 |
| 108 | 1.35607 | 1.36265 | 0.28290 | 0.00000 | 0.198406 | −0.02657 | 0.00658 |
| 109 | 1.36265 | 1.36919 | 0.28622 | 0.00000 | 0.196443 | −0.02584 | 0.00654 |
| 110 | 1.36919 | 1.37570 | 0.28953 | 0.00000 | 0.194525 | −0.02514 | 0.00651 |
| 111 | 1.37570 | 1.38217 | 0.28719 | 0.00000 | 0.192460 | −0.02451 | 0.00647 |
| 112 | 1.38217 | 1.38862 | 0.29047 | 0.00000 | 0.190641 | −0.02385 | 0.00645 |
| 113 | 1.38862 | 1.39503 | 0.29372 | 0.00000 | 0.188876 | −0.02322 | 0.00641 |
| 114 | 1.39503 | 1.40142 | 0.29694 | 0.00000 | 0.187168 | −0.02261 | 0.00639 |

TABLE 6

| | Ring No. | hs (mm) | hl (mm) | A0 | A2 | A4 | A6 | Pitch (mm) |
|---|---|---|---|---|---|---|---|---|
| Intermediate area | 115 | 1.40142 | 1.40777 | 0.30260 | 0.00000 | 0.185613 | −0.02202 | 0.00635 |
| | 116 | 1.40777 | 1.41409 | 0.30572 | 0.00000 | 0.184040 | −0.02147 | 0.00632 |
| | 117 | 1.41409 | 1.42038 | 0.30879 | 0.00000 | 0.182540 | −0.02095 | 0.00629 |
| | 118 | 1.42038 | 1.42665 | 0.31179 | 0.00000 | 0.181119 | −0.02046 | 0.00627 |
| | 119 | 1.42665 | 1.43288 | 0.30915 | 0.00000 | 0.179531 | −0.02003 | 0.00623 |
| | 120 | 1.43288 | 1.43908 | 0.31199 | 0.00000 | 0.178272 | −0.01960 | 0.00620 |
| | 121 | 1.43908 | 1.44525 | 0.31472 | 0.00000 | 0.177110 | −0.01920 | 0.00617 |
| | 122 | 1.44525 | 1.45140 | 0.31734 | 0.00000 | 0.176051 | −0.01885 | 0.00615 |
| Peripheral area | 123 | 1.45140 | 1.48504 | 0.00356 | 0.43039 | −0.028837 | 0.01481 | 0.03364 |
| | 124 | 1.48504 | 1.52404 | −0.02036 | 0.46504 | −0.044431 | 0.01717 | 0.03900 |
| | 125 | 1.52404 | 1.57735 | −0.05909 | 0.51692 | −0.066597 | 0.02036 | 0.05331 |
| | 126 | 1.57735 | 1.68994 | −0.11461 | 0.58552 | −0.093985 | 0.02403 | 0.11259 |
| | 127 | 1.68994 | 1.73016 | 0.04430 | 0.41718 | −0.035205 | 0.01716 | 0.04022 |
| | 128 | 1.73016 | 1.75573 | 0.35374 | 0.10533 | 0.068936 | 0.00555 | 0.02557 |
| | 129 | 1.75573 | 1.77560 | 0.75304 | −0.28449 | 0.195187 | −0.00810 | 0.01987 |
| | 130 | 1.77560 | 1.79219 | 0.44580 | 0.00000 | 0.106847 | 0.00103 | 0.01659 |
| | 131 | 1.79219 | 1.80661 | 0.42668 | 0.00000 | 0.111826 | −0.00002 | 0.01442 |
| | 132 | 1.80661 | 1.81944 | 0.40049 | 0.00000 | 0.118620 | −0.00142 | 0.01283 |
| | 133 | 1.81944 | 1.83107 | 0.36745 | 0.00000 | 0.127087 | −0.00314 | 0.01163 |
| | 134 | 1.83107 | 1.84173 | 0.32759 | 0.00000 | 0.137141 | −0.00515 | 0.01066 |
| | 135 | 1.84173 | 1.85160 | 0.28093 | 0.00000 | 0.148717 | −0.00743 | 0.00987 |
| | 136 | 1.85160 | 1.86080 | 0.22745 | 0.00000 | 0.161773 | −0.00997 | 0.00920 |
| | 137 | 1.86080 | 1.86945 | 0.16701 | 0.00000 | 0.176290 | −0.01277 | 0.00865 |
| | 138 | 1.86945 | 1.87760 | 0.09954 | 0.00000 | 0.192246 | −0.01582 | 0.00815 |
| | 139 | 1.87760 | 1.88533 | 0.02495 | 0.00000 | 0.209619 | −0.01910 | 0.00773 |
| | 140 | 1.88533 | 1.89268 | −0.05690 | 0.00000 | 0.228411 | −0.02262 | 0.00735 |
| | 141 | 1.89268 | 1.89970 | −0.14614 | 0.00000 | 0.248616 | −0.02638 | 0.00702 |
| | 142 | 1.89970 | 1.90641 | −0.24285 | 0.00000 | 0.270219 | −0.03036 | 0.00671 |
| | 143 | 1.90641 | 1.91285 | −0.34713 | 0.00000 | 0.293211 | −0.03457 | 0.00644 |
| | 144 | 1.91285 | 1.91904 | −0.45913 | 0.00000 | 0.317596 | −0.03900 | 0.00619 |
| | 145 | 1.91904 | 1.92500 | −0.57889 | 0.00000 | 0.343357 | −0.04365 | 0.00596 |

As shown in Table 1, Example 1 satisfies m1=0, m2=0, and m3=0. Further, d/f=2.67/22=121 holds. The value of d/f is relatively large and a working distance for a CD is hardly secured in such the objective lens generally. However, in Example 1, the objective lens successfully ensures the working distance for CD, which is 0.359 mm. As can be seen from Tables 2 to 6, the minimum pitch of the first optical path difference providing structure is about 7.6 µm, and the average pitch is about 14.39 µm. Therefore, p/fl=0.00345 holds.

It is farther understood that well-balanced and high diffraction efficiency is exhibited for each type of optical disc, where the diffraction efficiency is 87.3% for BD, 74.6% for DVD and 60.9% for CD.

Figure 8A:
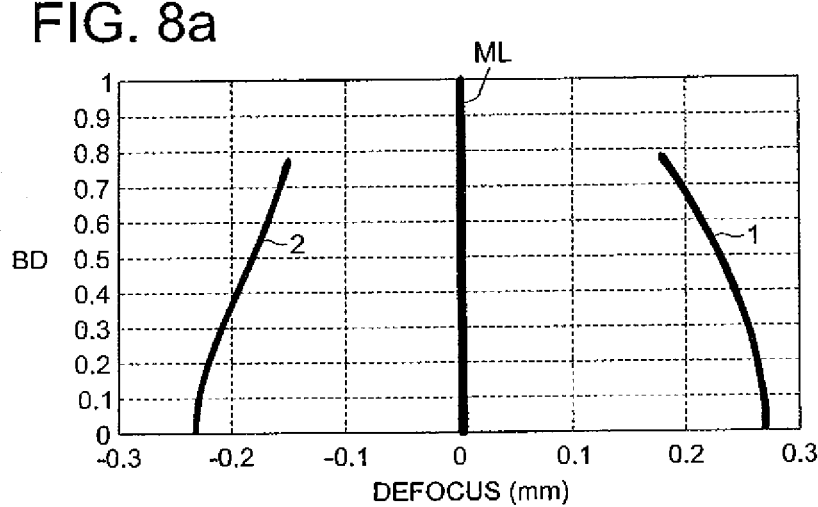
FIGS. 8a-8c are spherical aberration diagrams of Example 1.
Figure 8B:
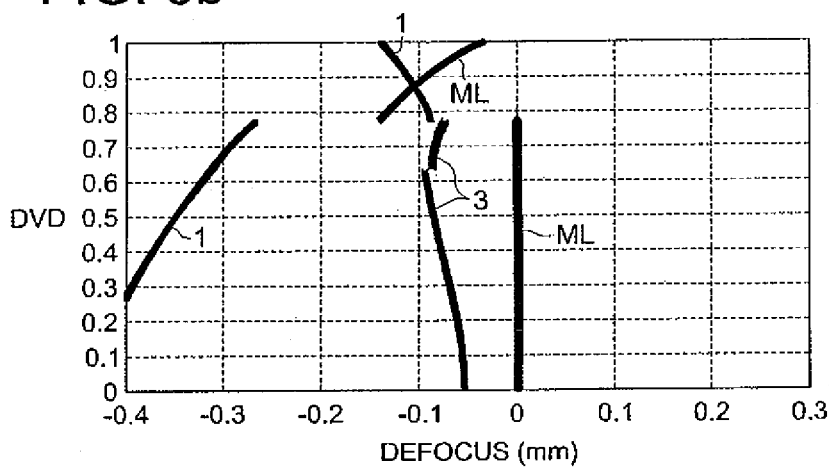
Figure 8C:
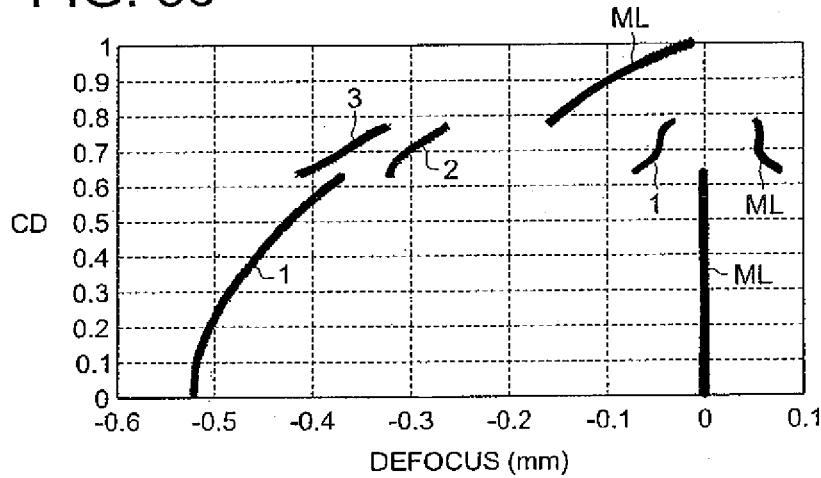

FIGS. 8a to 8c shows spherical aberration diagrams of Example 1. FIG. 8a is a spherical aberration diagram for BD. FIG. 8b is a spherical aberration diagram for DVD. FIG. 8c is a spherical aberration diagram for CD. In the aberration diagrams, symbol LM represents a spherical aberration of main light which is a diffracted light flux with a diffraction order having the maximum light amount among diffracted light fluxes with any other diffraction order, symbol 1 represents a spherical aberration of unwanted light 1 which is a diffracted light flux in another diffraction order having a less light amount than the main light and is not used for recording and/or reproducing information for an optical disc, symbol 2 represents a spherical aberration of unwanted light 2 which is a diffracted light flux with another diffraction order having a less light amount than the main light and is not used for recording and/or reproducing information for an optical disc, and symbol 3 represents a spherical aberration of unwanted light 3 which is a diffracted light flux with another diffraction order having a less light amount than the main light and is not used for recording and/or reproducing information for an optical disc. As can be seen from FIGS. 8a to 8c, excellent spherical aberration is kept within necessary numerical aperture under the condition of m1=0, m2=0 and m3=0 for all of a BD, DVD and CD, and recording and/or reproducing information can be conducted properly for the types of optical disc. As can be seen from FIGS. 8a to 8c, phase shift is not caused at the boundary of the central area and the intermediate area, which is preferable.

Herein, chromatic aberration in Example 1 is 0.67 μm/nm. Table 7 shows wavelength characteristics and temperature characteristics of Example 1. When the wavelength of the first light source changes by +5 nm, the third order spherical aberration is −0.105 λms, and the fifth order spherical aberration is −0.024 λms. When the temperature wavelength rises by +30 degrees, the third order spherical aberration is 0.114 λms, and the fifth order spherical aberration is 0.025 λms. These are corrected by a magnification correction. Where, the magnification correction means a correction of the magnification carried out by displacing the collimation lens.

TABLE 7

|  | Before magnification correction | After magnification correction |
|---|---|---|
| Δλ + 5 nm |  |  |
| SA3 | −0.105 | 0.000 |
| SA5 | −0.024 | −0.006 |
| SA7 | −0.010 | −0.006 |
| ΔT + 30 deg |  |  |
| SA3 | 0.114 | 0.000 |
| SA5 | 0.025 | 0.005 |
| SA7 | 0.002 | −0.002 |

Table 7 shows that the third order spherical aberration and fifth order spherical aberration which are caused when a wavelength becomes longer, are both under-corrected (insufficient correction) in Example 1. Table 7 further shows a preferable result that an absolute value of temperature characteristics is small, which is preferable on the point of a displacement amount of a collimation lens and of resolving power of correction.

FIG. 9 shows a wavelength dependency of diffraction efficiency of Example 1. As can be seen from FIG. 9, fluctuation of diffraction efficiency caused by wavelength fluctuation is controlled to be small for each of a BD, DVD and CD, and referable results are obtained.

The present invention is not limited to the examples described in the specification, and it is clear, for those having ordinary skill in the art in the present field from the examples and spirits described in the present specification, that the invention includes other examples and variations.

Objectives of the descriptions and the examples in the specification are illustrations persistently, and the scope of the invention is shown by the claims described later.

What is claimed is:

1. An objective lens for use in an optical pickup apparatus which comprises
    a first light source for emitting a first light flux having a first wavelength $\lambda 1$,
    a second light source for emitting a second light flux having a second wavelength $\lambda 2 (\lambda 2 > \lambda 1)$,
    a third light source for emitting a third light flux having a third wavelength $\lambda 3$ $(\lambda 3 > \lambda 2)$, and
    which records and/or reproduces information with the first light flux on an information recording surface of a BD having a protective substrate with a thickness t1, records and/or reproduces information with the second light flux on an information recording surface of a DVD having a protective substrate with a thickness t2 (t1<t2), and records and/or reproduces information with the third light flux on an information recording surface of a CD having a protective substrate with a thickness t3 (t2<t3), the objective lens comprising:
    an optical surface including a central area, an intermediate area surrounding the central area, and a peripheral area surrounding the intermediate area,
    wherein the central area includes a first optical path difference providing structure and the intermediate area includes a second optical path difference providing structure,
    wherein the objective lens converges the first light flux which passes through the central area, onto the information recording surface of the BD so that information can be recorded and/or reproduced on the information recording surface of the BD,
    the objective lens converges the second light flux which passes through the central area, onto the information recording surface of the DVD so that information can be recorded and/or reproduced on the information recording surface of the DVD, and
    the objective lens converges the third light flux which passes through the central area, onto the information recording surface of the CD so that information can be recorded and/or reproduced on the information recording surface of the CD,
    wherein the objective lens converges the first light flux which passes through the intermediate area, onto the information recording surface of the BD so that information can be recorded and/or reproduced information on the information recording surface of the BD,
    the objective lens converges the second light flux which passes through the intermediate area, onto the information recording surface of the DVD so that information can be record and/or reproduce information on the information recording surface of the DVD, and
    the objective lens does not converge the third light flux which passes through the intermediate area, onto the information recording surface of the CD so that information can be recorded and/or reproduced on the information recording surface of the CD,
    wherein the objective lens converges the first light flux which passes through the peripheral area, onto the information recording surface of the BD so that information can be recorded and/or reproduced on the information recording surface of the BD,
    the objective lens does not converge the second light flux which passes through the peripheral area, onto the information recording surface of the DVD so that information can be recorded and/or reproduced on the information recording surface of the DVD, and
    the objective lens does not converge the third light flux which passes through the peripheral area, onto the information recording surface of the CD so that information can be recorded and/or reproduced on the information recording surface of the CD,
    wherein the first optical path difference providing structure comprises a first basic structure and a second basic structure which are overlapped with each other,
    the first basic structure is a blaze-type structure, which emits a Xth-order diffracted light flux with a larger light amount than diffracted light fluxes with any other diffraction order, when the first light flux passes through the first basic structure, which emits a Yth-order diffracted light flux with a larger light amount than diffracted light fluxes with any other diffraction order, when the second light flux passes through the first basic structure, and which emits a Zth-order diffracted light flux with a larger light amount than diffracted light fluxes with any other diffraction order, when the third light flux passes through the first basic structure, a value of X is an odd integer, all steps of the first basic structure arranged around an optical axis in the central area face an opposite direction to the optical axis, the second basic structure is a blaze-type structure which emits a Lth-order diffracted light flux with a larger light amount than diffracted light fluxes with any other diffraction order, when the first light flux passes through the second basic structure, which emits a Mth-order diffracted light flux with a larger light amount than diffracted light fluxes with any other diffraction order, when the second light flux passes through the second basic structure, and which emits a Nth-order diffracted light flux with a larger light amount than diffracted light fluxes with any other diffraction order, when the third light flux passes through the second basic structure, a value of L is an even integer, and all steps of the second basic structure arranged around an optical axis in the central area face the optical axis, wherein the objective lens satisfies $1.0 \le d/f \le 1.5$, where d is a thickness (mm) of the objective lens along the optical axis and f is a focal length (mm) of the objective lens for the first light flux.

2. The objective lens of claim 1, wherein the first basic structure exhibits under-corrected aberration when wavelength of the incident light flux becomes longer.

3. The objective lens of claim 1, wherein the value of L is an even number whose absolute value is 4 or less, and the value of X is an odd number whose absolute value is 5 or less.

4. The objective lens of claim 1, wherein the objective lens satisfies $(|X|, |Y|, |Z|) = (1, 1, 1)$ and $(|L|, |M|, |N|) = (2, 1, 1)$.

5. The objective lens of claim 1, wherein the number of steps facing the opposite direction to the optical axis is larger than the number of steps facing the optical axis, in the central area.

6. The objective lens of claim 1, wherein, when any one of the first light flux, the second light flux and the third light flux whose wavelength is longer than the corresponding wavelength among the first wavelength, the second wavelength, and the third wavelength enters the objective lens, the objective lens generates a third order spherical aberration and a fifth order spherical aberration each of which is under-corrected.

7. The objective lens of claim 1, wherein the objective lens generates a longitudinal chromatic aberration of 0.9 μm/nm or less.

8. The objective lens of claim 7, wherein the longitudinal chromatic aberration is 0.4 μm/nm or more.

9. The objective lens of claim 1, wherein the objective lens satisfies $-0.01 < m1 < 0.01$, $-0.01 m2 < 0.01$, and $-0.01 < m3 < 0.01$, where m1 is a magnification of the objective lens when the first light flux enters the objective lens, m2 is a magnification of the objective lens when the second light flux enters the objective lens, and m3 is a magnification of the objective lens when the third light flux enters the objective lens.

10. An optical pickup apparatus comprising:

a first light source for emitting a first light flux having a first wavelength λ1;

a second light source for entitling a second light flux having a second wavelength λ2 (λ2>λ1);

a third light source for emitting a third light flux having a third wavelength λ3 (λ3>λ2); and the objective lens of claim 1, wherein the optical pickup apparatus records and/or reproduces information with the first light flux on an information recording surface of a first optical disc having a protective substrate with a thickness t1, records and/or reproduces information with the second light flux on an information recording surface of a second optical disc having a protective substrate with a thickness t2 (t1<t2), and records and/or reproduces information with the third light flux on an information recording surface of a third optical disc having a protective substrate with a thickness t3 (t2<t3).

11. An optical information recording and reproducing apparatus comprising the optical pickup apparatus of claim 10.

* * * * *